US012776825B2

(12) United States Patent
Yang et al.

(10) Patent No.: US 12,776,825 B2

(45) Date of Patent: Oct. 27, 2026

(54) ANTI-INTERFERENCE ELECTRONIC DEVICE AND ANTI-INTERFERENCE METHOD

(71) Applicant: Huawei Technologies Co., Ltd., Shenzhen (CN)

(72) Inventors: Rui Yang, Beijing (CN); Hui Jin, Shenzhen (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 730 days.

(21) Appl. No.: 18/040,056

(22) PCT Filed: Jul. 30, 2021

(86) PCT No.: PCT/CN2021/109578

§ 371 (c)(1),
(2) Date: Jan. 31, 2023

(87) PCT Pub. No.: WO2022/022681

PCT Pub. Date: Feb. 3, 2022

(65) Prior Publication Data

US 2024/0048222 A1 Feb. 8, 2024

(30) Foreign Application Priority Data

Jul. 31, 2020 (CN) ......................... 202010758633.4

(51) Int. Cl.

*H04B 7/155* (2006.01)
*H04B 15/02* (2006.01)

(52) U.S. Cl.

CPC ..... *H04B 7/15507* (2013.01); *H04B 7/15535* (2013.01); *H04B 15/02* (2013.01)

(58) Field of Classification Search

CPC ........... H04B 7/15507; H04B 7/15535; H04B 15/02; H04B 1/10; H04B 1/525;
(Continued)

(56) References Cited

U.S. PATENT DOCUMENTS 8,126,030 B2 * 2/2012 Klomsdorf ........... H04B 1/1027
375/220
9,160,462 B2 * 10/2015 Lin ...................... H04B 1/1036
(Continued)

FOREIGN PATENT DOCUMENTS

CN 101018063 A 8/2007
CN 102195660 A 9/2011
(Continued)

OTHER PUBLICATIONS

Rui Yin et al., "A Framework for Co-Channel Interference and Collision Probability Tradeoff in LTE Licensed-Assisted Access Networks," Jun. 8, 2016, 13 pages.
(Continued)

*Primary Examiner* — Charles N Appiah

(74) *Attorney, Agent, or Firm* — Conley Rose, P.C.

(57) ABSTRACT

An electronic device includes a first transmission circuit and an anti-interference circuit. The first transmission circuit includes a first receive end, a first transmit end, and a first conversion system. The first conversion system is configured to convert a first-type signal in a signal received by the first receive end into a second-type signal to be sent by the first transmit end. The anti-interference circuit is configured to cancel the second-type signal from the signal received by the first receive end. The cancelled second-type signal is sent by the first transmit end and then received by the first receive end.

20 Claims, 9 Drawing Sheets

(58) Field of Classification Search
CPC .......... H04W 28/0231; H04W 28/0236; Y02D 30/70; H04K 3/25
See application file for complete search history.

(56) References Cited

U.S. PATENT DOCUMENTS

| | | | | |
|---|---|---|---|---|
| 10,219,162 | B1 * | 2/2019 | Sun | H04B 1/406 |
| 2007/0184804 | A1 * | 8/2007 | Robert | H04B 1/3805<br>455/295 |
| 2009/0190633 | A1 | 7/2009 | Smith | |
| 2013/0258922 | A1 | 10/2013 | Park | |
| 2015/0043685 | A1 | 2/2015 | Choi et al. | |
| 2015/0229461 | A1 | 8/2015 | Difazio et al. | |
| 2016/0056946 | A1 | 2/2016 | Moher | |
| 2016/0353402 | A1 | 12/2016 | Chong et al. | |
| 2016/0365914 | A1 | 12/2016 | Lin et al. | |
| 2017/0365908 | A1 * | 12/2017 | Hughes | G02F 1/163 |
| 2018/0041306 | A1 | 2/2018 | Bae et al. | |
| 2020/0067549 | A1 | 2/2020 | Raghavan | |
| 2020/0228159 | A1 | 7/2020 | Raghavan et al. | |

FOREIGN PATENT DOCUMENTS

| | | | | |
|---|---|---|---|---|
| CN | 102859902 | A | 1/2013 | |
| CN | 103190090 | A | 7/2013 | |
| CN | 103297069 | A | 9/2013 | |
| CN | 104518808 | A | 4/2015 | |
| CN | 104717303 | A | 6/2015 | |
| CN | 104883202 | A | 9/2015 | |
| CN | 105450559 | A | 3/2016 | |
| CN | 105493416 | A | 4/2016 | |
| CN | 106817134 | A | 6/2017 | |
| CN | 107147426 | A | 9/2017 | |
| CN | 107276602 | A | 10/2017 | |
| CN | 107872240 | A | 4/2018 | |
| CN | 108847866 | A | 11/2018 | |
| CN | 110808748 | A | 2/2020 | |
| EP | 2237455 | A2 * | 10/2010 | H04B 1/525 |
| KR | 20180126207 | A | 11/2018 | |
| KR | 20190123442 | A | 11/2019 | |
| KR | 20200027214 | A | 3/2020 | |
| WO | 2004073331 | A2 | 8/2004 | |
| WO | 2019213414 | A1 | 11/2019 | |

OTHER PUBLICATIONS

Huang Jing et al., "Brief Introduction of Intelligent Interference Management Technology for 5G Wireless Network," Jan. 24, 2020, 4 pages.

Yan Xiaolong et al., "eLTE-U Bearer Urban Rail CBTC Solution," Jan. 17, 2020, 4 pages.

* cited by examiner

ANTI-INTERFERENCE ELECTRONIC DEVICE AND ANTI-INTERFERENCE METHOD

CROSS-REFERENCE TO RELATED APPLICATIONS

This is a U.S. National Stage of International Patent Application No. PCT/CN2021/109578 filed on Jul. 30, 2021, which claims priority to Chinese Patent Application No. 202010758633.4 filed on Jul. 31, 2020. Both of the aforementioned applications are hereby incorporated by reference in their entireties.

TECHNICAL FIELD

This application relates to the field of communication technologies, and in particular, to an anti-interference electronic device and an anti-interference method.

BACKGROUND

A customer premise equipment (Customer Premise Equipment, CPE) is usually deployed on a client of a fiber to the x (Fiber To The x. FTTX) home customer service, and is configured to provide integrated access to a wired broadband service, an internet protocol television (Internet Protocol Television. IPTV) service, and a voice over internet protocol (Voice over Internet Protocol, VoIP) service for home customers.

An existing wireless CPE device may not only perform secondary relay on a wireless fidelity (Wireless Fidelity, Wi-Fi) signal, but also receive a base station signal and convert a wireless mobile cellular signal into a Wi-Fi signal, to improve indoor coverage and an access capability. However, in an actual application scenario, because a cellular network and a Wi-Fi network work in adjacent frequency bands, a transmitter in the cellular network usually causes severe adjacent-channel interference to a receiver in the Wi-Fi network. As a result, demodulation performance of a Wi-Fi link deteriorates, which affects user experience.

SUMMARY

Embodiments of this application provide an anti-interference electronic device and an anti-interference method. An anti-interference circuit is designed to be added in a CPE device 200, to cancel an interference signal on a Wi-Fi link; or a main controller module is designed in a CPE device 200, so that a Wi-Fi frequency hopping policy is obtained based on a detection or learning result of the main controller module and sent to a Wi-Fi link for the Wi-Fi link to camp on or perform frequency hopping to an appropriate candidate channel to continue working, thereby achieving an anti-interference objective. In the solutions in embodiments of this application, an interference situation can be evaluated more accurately, anti-interference can be better implemented when a bandwidth configured in a new radio (New Radio, NR) is large, demodulation performance of the Wi-Fi link is improved, and quality of an entire communication link and user experience are improved.

According to a first aspect, an embodiment of this application provides an electronic device. The electronic device includes a first transmission circuit and an anti-interference circuit. The first transmission circuit includes a first receive end, a first transmit end, and a first conversion module. The first conversion module is configured to convert a first-type signal in a signal received by the first receive end into a second-type signal to be sent by the first transmit end. The anti-interference circuit is configured to cancel the second-type signal in the signal received by the first receive end. The cancelled second-type signal is sent by the first transmit end and then received by the first receive end.

For example, in an uplink communication process of a CPE device, a Wi-Fi signal in a signal received by a Wi-Fi receive end is processed and then input to a Wi-Fi modem for demodulation, a demodulated Wi-Fi signal is input to a cellular network modem for modulation into a cellular signal, and a modulated cellular signal is processed and sent by a cellular transmit end. Due to adjacent-channel interference, low-frequency cellular signals are mixed into the signal received by the Wi-Fi receive end, causing adjacent-channel interference.

In a possible implementation of the first aspect, the electronic device further includes: The anti-interference circuit cancels the second-type signal in the signal received by the first receive end in the following manner. The anti-interference circuit obtains, at a first moment, the second-type signal to be sent by the first transmit end. The anti-interference circuit performs delay and phase inversion processing on the second-type signal, to obtain a delayed and phase-inverted second-type signal. The anti-interference circuit performs, based on antenna gains of the first transmit end and the first receive end, gain processing on the delayed and phase-inverted second-type signal, to obtain a delayed, phase-inverted, and gained second-type signal. The anti-interference circuit cancels, by using the delayed, phase-inverted, and gained second-type signal at a second moment, the second-type signal in the signal received by the first receive end. Delay duration in which the anti-interference circuit performs delay processing on the second-type signal is a time difference between the second moment and the first moment.

For example, because an interference signal is a cellular signal transmitted by the cellular transmit end in the CPE device, a delay needs to be considered in design. To be specific, in the uplink communication process in the CPE device, there are delays for different duration after the cellular signal is transmitted by the cellular transmit end and before the cellular signal sent by the cellular transmit end is received by the Wi-Fi receive end and then causes adjacent-channel interference. In addition, an antenna gain needs to be considered. When the cellular signal sent by the cellular transmit end is received by the Wi-Fi receive end in the Wi-Fi link and then causes adjacent-channel interference, the interference signal or the cellular signal needs to be sent through a transmitter antenna of the cellular transmit end and a receiver antenna of the Wi-Fi receive end. If a signal obtained before the cellular transmit end is used as an interference signal, compared with an actual interference signal, the obtained signal lacks an antenna gain generated through the antenna.

In a possible implementation of the first aspect, the electronic device further includes. The first receive end is a Wi-Fi receive end. The first transmit end is a cellular transmit end. The first-type signal is a Wi-Fi signal. The second-type signal is a cellular signal. A signal received by the Wi-Fi receive end includes a Wi-Fi signal and a cellular signal. The first conversion module is configured to convert the Wi-Fi signal in the signal received by the Wi-Fi receive end into a cellular signal to be sent by the cellular transmit end. The cellular signal in the signal received by the Wi-Fi receive end is an interference signal of the Wi-Fi signal.

In a possible implementation of the first aspect, the electronic device further includes: The anti-interference circuit includes an analog signal obtaining device, configured to obtain, at the first moment, an analog cellular signal transmitted between the first conversion module and the cellular transmit end; a delayer, connected to the analog signal obtaining device, and configured to perform delay processing on the cellular signal to obtain a delayed cellular signal; a phase inverter, connected to the delayer, and configured to perform phase inversion processing on the delayed cellular signal to obtain a delayed and phase-inverted cellular signal; an adder, connected to the phase inverter, and configured to perform gain processing on the delayed and phase-inverted cellular signal to obtain a delayed, phase-inverted, and gained cellular signal; and an analog signal interference canceller, configured to obtain, at the second moment, a signal transmitted between the Wi-Fi receive end and the first conversion module, and cancel a cellular signal in the obtained signal by superposing the delayed, phase-inverted, and gained cellular signal and the obtained signal.

For example, in an anti-interference process of the anti-interference circuit designed in the CPE device, the analog signal obtaining device obtains an analog cellular signal from a cellular link, the delayer performs delay processing on the obtained analog cellular signal, the phase inverter performs phase inversion processing on the obtained analog cellular signal, the adder performs gain processing on the obtained analog cellular signal, and finally, the analog signal interference canceller cancels an analog cellular signal that is on the Wi-Fi link and that is used as an interference signal. An analog cellular signal processed by the anti-interference circuit is equivalently reversed to an interference signal intercepted by the anti-interference circuit on the Wi-Fi link. The interference signal is cancelled through phase superposition.

In a possible implementation of the first aspect, the electronic device further includes a first frequency mixer, a first low-pass filter, and an analog-to-digital converter, where the first frequency mixer, the first low-pass filter, and the analog-to-digital converter are sequentially located between the Wi-Fi receive end and the first conversion module; and a digital-to-analog converter, a second low-pass filter, and a second frequency mixer, where the digital-to-analog converter, the second low-pass filter, and the second frequency mixer are sequentially located between the first conversion module and the cellular transmit end.

For example, in the uplink communication process in the CPE device, on the Wi-Fi link, the signal received by the Wi-Fi receive end is sequentially processed by the first frequency mixer, the first low-pass filter, and the analog-to-digital converter, and then input into the Wi-Fi modem for demodulation. On the cellular link, the cellular signal modulated by the cellular network modem sequentially passes through the digital-to-analog converter, the second low-pass filter, and the second frequency mixer, and is input to the cellular transmit end for sending. The first frequency mixer may be the frequency mixer 102 in Embodiment 1 below, the first low-pass filter may be the low-pass filter 103 in Embodiment 1 below, the second low-pass filter may be the low-pass filter 108 in Embodiment 1 below, and the second frequency mixer may be the frequency mixer 109 in Embodiment 1 below.

In a possible implementation of the first aspect, the electronic device further includes: The analog signal obtaining device obtains an analog cellular signal output by the second frequency mixer to the cellular transmit end. The analog signal interference canceller is located between the Wi-Fi receive end and the first frequency mixer, and superimposes the signal received by the Wi-Fi receive end and the delayed, phase-inverted, and gained cellular signal, to cancel the cellular signal in the signal received by the Wi-Fi receive end.

For example, in the uplink communication process in the CPE device, the analog signal obtaining device in the anti-interference circuit obtains an analog cellular signal from a transmission line between the second frequency mixer and the cellular transmit end. Correspondingly, the anti-interference circuit obtains an interference signal from a transmission line between the Wi-Fi receive end and the first frequency mixer, and cancels the interference signal. In this way, it can be ensured that two signals that are mutually superimposed to cancel an interference signal have the same signal characteristics except a gain. The anti-interference circuit only needs to perform delay, phase inversion, and gain processing on the obtained analog cellular signal to obtain an analog cellular signal which is equivalently inversed to the interference signal.

Similarly, in a possible implementation of the first aspect, the electronic device further includes: The analog signal obtaining device obtains an analog cellular signal output by the second low-pass filter to the second frequency mixer. The analog signal interference canceller is located between the first frequency mixer and the first low-pass filter, and superimposes a signal output by the first frequency mixer and the delayed, phase-inverted, and gained cellular signal, to cancel a cellular signal in the signal output by the first frequency mixer.

Alternatively, the analog signal obtaining device obtains an analog cellular signal output by the digital-to-analog converter to the second low-pass filter. The analog signal interference canceller is located between the first low-pass filter and the analog-to-digital converter, and superimposes a signal output by the first low-pass filter and the delayed, phase-inverted, and gained cellular signal, to cancel a cellular signal in the signal output by the first low-pass filter.

In a possible implementation of the first aspect, the electronic device further includes the anti-interference circuit. The anti-interference circuit includes: a signal obtaining module, configured to obtain, at the first moment, a digital cellular signal transmitted between the first conversion module and the cellular transmit end; a delay negation module, connected to the signal obtaining module, and configured to perform delay and negation processing on the digital cellular signal to obtain a delayed and negated cellular signal; a gain control module, connected to the delay negation module, and configured to perform gain processing on the delayed and negated cellular signal to obtain a delayed, negated, and gained cellular signal; and an interference cancellation module, configured to obtain, at the second moment, a signal transmitted between the Wi-Fi receive end and the first conversion module, and cancel a cellular signal in the obtained signal by superposing the delayed, negated, and gained cellular signal and the obtained signal.

For example, in the uplink communication process in the CPE device, the anti-interference circuit may alternatively obtain the digital cellular signal from the cellular link, and cancel a digital interference signal on the Wi-Fi link.

In a possible implementation of the first aspect, the electronic device further includes an analog-to-digital converter, where the analog-to-digital converter is located between the Wi-Fi receive end and the first conversion module, and a digital-to-analog converter, where the digital-to-analog converter is located between the first conversion module and the cellular transmit end. The signal obtaining module obtains a digital cellular signal output by the first conversion module to the digital-to-analog (D/A) converter. The interference cancellation module is located between the first conversion module and the analog-to-digital (A/D) converter, and superimposes a signal output by the analog-to-digital converter and the delayed, negated, and gained cellular signal.

For example, in the uplink communication process in the CPE device, the signal obtaining module may obtain a digital cellular signal transmitted between the digital-to-analog converter and the cellular network modem. Correspondingly, the interference cancellation module may cancel an interference signal transmitted between the analog-to-digital converter and the Wi-Fi modem.

In a possible implementation of the first aspect, the electronic device further includes a second transmission circuit. The second transmission circuit includes a cellular receive end, a Wi-Fi transmit end, and a second conversion module. The second conversion module is configured to convert a cellular signal received by the cellular receive end into a Wi-Fi signal to be sent by the Wi-Fi transmit end. The electronic device is a CPE device, and the second conversion module includes a Wi-Fi modem and a cellular network modem.

For example, in a downlink communication process of the CPE device, a cellular signal received by the cellular receive end is processed and input to the cellular network modem for demodulation, a demodulated cellular signal is input to the Wi-Fi modem for modulation into a Wi-Fi signal, and the Wi-Fi signal is processed and input to the Wi-Fi transmit end for sending.

According to a second aspect, an embodiment of this application provides an anti-interference method. The method includes: An anti-interference circuit obtains, at a first moment, a second-type signal to be sent by a first transmit end. The anti-interference circuit performs delay and phase inversion processing on the second-type signal, to obtain a delayed and phase-inverted second-type signal. The anti-interference circuit performs, based on antenna gains of the first transmit end and a first receive end, gain processing on the delayed and phase-inverted second-type signal, to obtain a delayed, phase-inverted, and gained second-type signal. The anti-interference circuit cancels, by using the delayed, phase-inverted, and gained second-type signal at a second moment, a second-type signal in a signal received by the first receive end. Delay duration in which the anti-interference circuit performs delay processing on the second-type signal is a time difference between the second moment and the first moment.

For example, in an anti-interference process, to ensure that an interference signal on a Wi-Fi link can be accurately cancelled at a moment, delay processing needs to be accurately performed on a cellular signal obtained by the anti-interference circuit. Duration of the delay processing is time for transmitting the cellular signal from an obtaining point to a location at which the interference signal is cancelled by the anti-interference circuit. In this way, it can be ensured that the two signals overlap at the second moment, and can be mutually superimposed to cancel an interference signal.

In a possible implementation of the first aspect, the method further includes: The second-type signal obtained by the anti-interference circuit at the first moment is an analog signal.

For example, in the anti-interference process, the anti-interference circuit may obtain an analog cellular signal at any location between a cellular transmit end and a D/A converter. Correspondingly, the anti-interference circuit cancels an analog interference signal between a Wi-Fi receive end and an A/D converter.

In a possible implementation of the first aspect, the method further includes: The second-type signal obtained by the anti-interference circuit at the first moment is a digital signal. The first receive end is a Wi-Fi receive end. The first transmit end is a cellular transmit end. The first-type signal is a Wi-Fi signal. The second-type signal is a cellular signal. The electronic device is a CPE device.

For example, in the anti-interference process, the anti-interference circuit may obtain a digital cellular signal at any location between a cellular network modem and a D/A converter. Correspondingly, the anti-interference circuit cancels a digital interference signal between a Wi-Fi modem and an A/D converter.

According to a third aspect, an embodiment of this application provides a signal anti-interference method in an electronic device. The electronic device includes a first receive end, a first transmit end, and a first conversion module. The first conversion module is configured to convert a first-type signal in a signal received by the first receive end into a second-type signal to be sent by the first transmit end.

The method includes; obtaining a signal received by the first receive end on a current working channel, where the signal includes the first-type signal and the second-type signal, and the second-type signal is sent by the first transmit end and received by the first receive end; calculating adjacent-channel interference strength of the current working channel based on the obtained signal, where the adjacent-channel interference strength indicates a degree of interference of the second-type signal to the first-type signal on the working channel; and determining, based on the calculated adjacent-channel interference strength of the current working channel, whether the current working channel meets a working condition.

For example, a main controller module with storage and processing functions is disposed in a CPE device. The intelligent channel main selection control chip obtains a signal of a current working channel on a Wi-Fi link, and calculates adjacent-channel interference strength of the current working channel, to evaluate a degree of interference on the current working channel on the Wi-Fi link.

In a possible implementation of the third aspect, the method further includes: when the current working channel does not meet the working condition, obtaining a signal received by the first receive end on a candidate channel, and calculating adjacent-channel interference strength; based on the calculated adjacent-channel interference strength of the candidate channel, selecting, from the candidate channel, a candidate channel that meets the working condition as a working channel of the first receive end; and when the current working channel meets the working condition, keeping a working channel of the first receive end as the current working channel.

For example, in an anti-interference process in the CPE device, if the adjacent-channel interference strength of the current working channel calculated by the main controller module is excessively low, the current working channel on the Wi-Fi link is not severely interfered. In this case, the Wi-Fi link is kept on the current working channel. If the adjacent-channel interference strength of the current working channel calculated by the main controller module is excessively high, the current working channel on the Wi-Fi link is severely interfered. In this case, a candidate channel with low intra-channel adjacent-channel interference strength is selected from other channels on the Wi-Fi link as a new working channel, to achieve the purpose of anti-interference.

In a possible implementation of the third aspect, the method further includes: when the adjacent-channel interference strength of the current working channel or the candidate channel is less than or equal to an adjacent-channel interference threshold, determining that the current working channel or the candidate channel meets a working condition; or when the adjacent-channel interference strength of the current working channel or the candidate channel is greater than an adjacent-channel interference threshold, determining that the current working channel or the candidate channel does not meet a working condition.

For example, in an anti-interference process in the CPE device, the adjacent-channel interference threshold may be introduced as a reference value to evaluate a degree of adjacent-channel interference of each channel on the Wi-Fi link. The adjacent-channel interference strength of each channel on the Wi-Fi link is compared with the adjacent-channel interference threshold. If the adjacent-channel interference strength is less than or equal to the adjacent-channel interference threshold, the channel meets a working condition of the Wi-Fi link. If the adjacent-channel interference strength is greater than the adjacent-channel interference threshold, the channel does not meet a working condition of the Wi-Fi link. In a same running environment of the CPE device, adjacent-channel interference thresholds of channels on the Wi-Fi link may be set to a same value.

In a possible implementation of the third aspect, the method further includes: calculating the adjacent-channel interference strength based on a ratio of a first part of signal energy to a second part of signal energy in the obtained signal. A first part of signal frequency is greater than a second part of signal frequency. In addition, the adjacent-channel interference threshold of the channel is determined based on an average value of ratios of the first part of signal energy to the second part of signal energy in the signal received by the first receive end on the channel when the channel is free of interference.

For example, in an anti-interference process in the CPE device, a ratio of high-frequency signal energy (namely, the first part of signal energy) to low-frequency signal energy (namely, the second part of signal energy) in a signal received by a Wi-Fi receive end in each channel on the Wi-Fi link is calculated, to calculate adjacent-channel interference strength of each channel on the Wi-Fi link. More interference signals received by the Wi-Fi receive end indicate a greater ratio of high-frequency signal energy to low-frequency signal energy, and greater adjacent-channel interference strength.

In a possible implementation of the third aspect, the method further includes: performing filtering processing and fast Fourier transform processing on the obtained signal, to obtain a first part of signal energy and a second part of signal energy in the signal, and calculating a ratio of the first part of signal energy to the second part of signal energy. For example, in an anti-interference process in the CPE device, the main controller module obtains a signal that is in each channel on the Wi-Fi link and is between an A/D converter and a Wi-Fi modem. The main controller module needs to perform secondary filtering processing on the obtained signal (for example, perform filtering processing by using a finite impulse response filter described in Embodiment 2 below). Then, a fast Fourier transform module performs Fourier transform on the obtained signal to calculate a high-frequency signal energy value and a low-frequency signal energy value of the signal, and to further calculate a ratio of the high-frequency signal energy value and the low-frequency signal energy value.

In a possible implementation of the third aspect, the method further includes: obtaining a frequency hopping priority list by sorting candidate channels that meet the working condition in ascending order of adjacent-channel interference strength; and when the current working channel does not meet the working condition, selecting, from the frequency hopping priority list, a candidate channel that meets the working condition as a working channel of the first receive end;

alternatively, obtaining a frequency hopping priority list by sorting candidate channels that meet the working condition in descending order of adjacent-channel interference strength; and when the current working channel does not meet the working condition, selecting, from the frequency hopping priority list, a candidate channel that meets the working condition as a working channel of the first receive end.

For example, in an anti-interference process in the CPE device, a channel whose adjacent-channel interference strength is less than or equal to an adjacent-channel interference threshold in all channels on the Wi-Fi link is a candidate channel that meets the working condition. The main controller module sorts the candidate channels that meet the working condition, to obtain the frequency hopping priority list. When the current working channel on the Wi-Fi link does not meet the working condition, the main controller module selects, as a new working channel on the Wi-Fi link, a candidate channel from the frequency hopping priority list.

In a possible implementation of the third aspect, the method further includes. The first receive end is a Wi-Fi receive end. The first transmit end is a cellular transmit end. The first-type signal is a Wi-Fi signal. The second-type signal is a cellular signal. The first conversion module is configured to convert a Wi-Fi signal received by the Wi-Fi receive end into a cellular signal to be sent by the cellular transmit end. The signal received by the Wi-Fi receive end includes a Wi-Fi signal and a cellular signal. In the signal received by the Wi-Fi receive end, the cellular signal is an interference signal of the Wi-Fi signal.

For example, in an anti-interference process in the CPE device, the main controller module is configured to evaluate a degree of interference to the Wi-Fi signal in the Wi-Fi link by the cellular signal.

In a possible implementation of the third aspect, the first conversion module includes a Wi-Fi modem. The method includes: when the current working channel does not meet the working condition, sending a frequency hopping indication to the Wi-Fi receive end or the Wi-Fi modem, to indicate the Wi-Fi receive end or the Wi-Fi modem to perform frequency hopping to work on a candidate channel that meets the working condition. The frequency hopping indication is a frequency of the candidate channel that meets the working condition. For example, in an anti-interference process in the CPE device, when the current working channel on the Wi-Fi link does not meet the working condition, the main controller module selects, as a new working channel on the Wi-Fi link, a candidate channel from a frequency hopping priority list. The main controller module sends the frequency of the selected candidate channel to the Wi-Fi receive end or Wi-Fi modem in the Wi-Fi link as the frequency hopping indication. After receiving the frequency hopping indication, the Wi-Fi receive end or Wi-Fi modem sends a frequency hopping signal to the Wi-Fi link to perform frequency hopping to work on the candidate channel selected by the main controller module.

In a possible implementation of the third aspect, the method further includes: The electronic device is a CPE device. The electronic device further includes a cellular receive end, a Wi-Fi transmit end, and a second conversion module. The second conversion module is configured to convert a cellular signal in a signal received by the cellular receive end into a Wi-Fi signal to be sent by the Wi-Fi transmit end.

For example, in a downlink communication process of the CPE device, a cellular signal received by the cellular receive end is processed and input to the cellular network modem for demodulation, a demodulated cellular signal is input to the Wi-Fi modem for modulation into a Wi-Fi signal, and the Wi-Fi signal is processed and input to the Wi-Fi transmit end for sending.

According to a fourth aspect, an embodiment of this application provides a readable medium. The readable medium stores instructions. When the instructions are executed on an electronic device, the electronic device is enabled to perform the foregoing signal anti-interference method in an electronic device.

According to a fifth aspect, an embodiment of this application provides an electronic device, including a first receive end, a first transmit end, a first conversion module, a memory, and a processor. The first conversion module is configured to convert a first-type signal in a signal received by the first receive end into a second-type signal to be sent by the first transmit end. The memory is configured to store instructions executed by one or more processors in the electronic device. The processor is one of processors of the electronic device, and is configured to perform the foregoing signal anti-interference method in the electronic device.

In a possible implementation of the fifth aspect, the method further includes: the electronic device further includes a digital-to-analog converter. The digital-to-analog converter is located between the first receive end and the first conversion module. The first conversion module includes a Wi-Fi modem. The memory and the processor obtain a signal between the digital-to-analog converter and the Wi-Fi modem.

For example, the electronic device may be a CPE device, or may be a wireless router, a computer, a cellular network-to-Wi-Fi wireless router, a mobile phone, or the like.

According to a sixth aspect, an embodiment of this application provides a signal anti-interference method in an electronic device. The electronic device includes a first receive end, a first transmit end, and a first conversion module. The first conversion module is configured to convert a first-type signal in a signal received by the first receive end into a second-type signal to be sent by the first transmit end.

The method includes: obtaining a current working parameter of the first transmit end when a current working channel of the first receive end does not meet a working condition of the first receive end; obtaining a channel priority list corresponding to the current working parameter, where in the channel priority list, each channel of the first receive end is sorted based on a signal quality parameter of a signal received by the channel when the first transmit end works under the current working parameter; and selecting, from the channel priority list corresponding to the current working parameter, a candidate channel that meets the working condition of the first receive end as a working channel of the first receive end.

For example, a main controller module with storage and processing functions is disposed in a CPE device. The main controller module obtains a current cellular parameter of a cellular link and a block error rate of signal transmission on a current working channel on a Wi-Fi link. The main controller module performs matching on the channel priority list corresponding to the current cellular parameter. When the block error rate of signal transmission on the current working channel on the Wi-Fi link is large and does not meet a working condition of the Wi-Fi link, the main controller module selects, as a new working channel on the Wi-Fi link, a candidate channel from a matched channel priority list.

In a possible implementation of the sixth aspect, the method further includes: collecting statistics on a plurality of working parameters of the first transmit end and signal quality parameters of signals received on a plurality of channels of the first receive end under each working parameter; and sorting, based on the signal quality parameters that are of the plurality of channels and that are corresponding to each working parameter, the plurality of channels of the first receive end, to obtain a channel priority list corresponding to each working parameter.

For example, in an anti-interference process in the CPE device, the main controller module may obtain a historical cellular parameter on the cellular link and a historical block error rate (namely, a signal quality parameter) of each channel on the Wi-Fi link. The intelligent channel selection main control chip sorts each channel on the Wi-Fi link based on the historical block error rate in each channel on the Wi-Fi link corresponding to each historical cellular parameter, to obtain a channel priority list corresponding to each historical cellular parameter.

In a possible implementation of the sixth aspect, the method further includes: when a signal quality parameter of a signal received on a current working channel of the first receive end is greater than or equal to a signal quality threshold, determining that the current working channel of the first receive end does not meet the working condition of the first receive end, where the signal quality threshold is determined by using an average value or a minimum value of the signal quality parameters of the signal received on the current working channel under the current working parameters of the first transmit end; and when the signal quality parameter of the signal received on the current working channel of the first receive end is less than the signal quality threshold, keeping the working channel of the first receive end as the current working channel.

For example, in an anti-interference process in the CPE device, a block error rate threshold (namely, a signal quality threshold) may be introduced as a reference value to determine whether each channel on the Wi-Fi link is suitable for working. The main controller module compares a block error rate in the current working channel on the Wi-Fi link with the block error rate threshold, to determine whether each channel on the Wi-Fi link meets the working condition.

In a possible implementation of the sixth aspect, the method further includes: when a signal quality score of a signal received by the first receive end on the candidate channel is less than a signal quality threshold, determining that the candidate channel meets the working condition of the first receive end.

For example, in an anti-interference process in the CPE device, if a block error rate in a candidate channel selected by the main controller module is less than a block error rate threshold, it may be determined that the selected candidate channel meets the working condition of the Wi-Fi receive end.

In a possible implementation of the sixth aspect, the method further includes: The signal quality parameter is a block error rate or a bit error rate. The first receive end is a Wi-Fi receive end. The first transmit end is a cellular transmit end. The first-type signal is a Wi-Fi signal. The second-type signal is a cellular signal. The first conversion module is configured to convert a Wi-Fi signal received by the Wi-Fi receive end into a cellular signal to be sent by the cellular transmit end. The signal received by the Wi-Fi receive end includes a Wi-Fi signal and a cellular signal. The cellular signal in the signal received by the Wi-Fi receive end is an interference signal of the Wi-Fi signal.

The first conversion module includes a Wi-Fi modem. The method further includes: sending a frequency hopping indication to the Wi-Fi receive end or the Wi-Fi modem when the current working channel does not meet a working condition of the Wi-Fi receive end, to indicate the Wi-Fi receive end or the Wi-Fi modem to perform frequency hopping to work on the selected candidate channel that meets the working condition. The frequency hopping indication is a frequency of the candidate channel that meets the working condition.

For example, in an anti-interference process in the CPE device, when the current working channel on the Wi-Fi link does not meet the working condition, the main controller module selects, as a new working channel on the Wi-Fi link, a candidate channel from other channels in the channel priority list corresponding to the current cellular parameter used by the cellular link. The main controller module sends the frequency of the selected candidate channel to the Wi-Fi receive end or Wi-Fi modem in the Wi-Fi link as the frequency hopping indication. After receiving the frequency hopping indication, the Wi-Fi receive end or Wi-Fi modem sends a frequency hopping signal to the Wi-Fi link to perform frequency hopping to work on the candidate channel selected by the main controller module.

In a possible implementation of the sixth aspect, the method further includes: The electronic device is a CPE device. The electronic device further includes a cellular receive end, a Wi-Fi transmit end, and a second conversion module. The second conversion module is configured to convert a cellular signal in a signal received by the cellular receive end into a Wi-Fi signal to be sent by the Wi-Fi transmit end.

For example, in a downlink communication process of the CPE device, a cellular signal received by the cellular receive end is processed and input to the cellular network modem for demodulation, a demodulated cellular signal is input to the Wi-Fi modem for modulation into a Wi-Fi signal, and the Wi-Fi signal is processed and input to the Wi-Fi transmit end for sending.

According to a seventh aspect, an embodiment of this application provides a readable medium. The readable medium stores instructions. When the instructions are executed on an electronic device, the electronic device is enabled to perform the foregoing signal anti-interference method in the electronic device.

According to an eighth aspect, an embodiment of this application provides an electronic device, including a first receive end, a first transmit end, a first conversion module, a memory, and a processor. The first conversion module is configured to convert a first-type signal in a signal received by the first receive end into a second-type signal to be sent by the first transmit end. The memory is configured to store instructions executed by one or more processors in the electronic device. The processor is one of processors of the electronic device, and is configured to perform the foregoing signal anti-interference method in the electronic device.

For example, the electronic device may be a CPE device, or may be a wireless router, a computer, a cellular network-to-Wi-Fi wireless router, a mobile phone, or the like.

DESCRIPTION OF EMBODIMENTS

To make the objectives, technical solutions, and advantages of this application more clearly, the following further describes the technical solutions in embodiments of this application in detail with reference to the accompanying drawings and specific embodiments.

Illustrative embodiments of this application include but are not limited to an anti-interference method and device, an apparatus, a frequency hopping policy, and the like.

The following specifically describes the technical solutions in specific embodiments of this application by using a CPE device 200 with a cellular network and a Wi-Fi network as an example and with reference to the accompanying drawings.

Figure 1A:
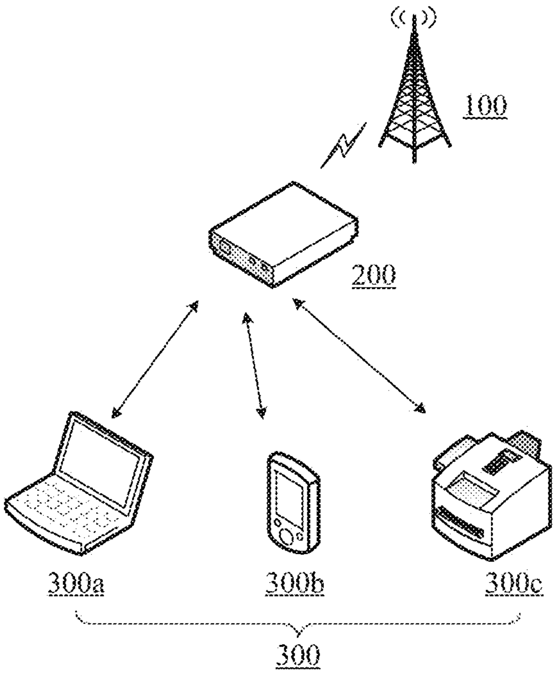
FIG. 1*a* is a schematic diagram of an application scenario according to an embodiment of this application.

FIG. 1*a* shows an example of a scenario of using the CPE device 200. As shown in FIG. 1*a*, terminal devices 300 such as a notebook computer 300*a*, a mobile phone 300*b*, and a multi-function printer 300*c* may be connected to a communication base station 100 via the CPE device 200 to implement an internet access function. The CPE device 200 converts a cellular network signal from the communication base station 100 into a Wi-Fi network signal to be used by the terminal devices 300. For example, the CPE device 200 implements an uplink connection to a passive optical network (Passive Optical Network, PON) and a downlink connection to the specific service terminal devices 300, to complete a connection between an access network and user equipment.

It may be understood that the CPE device 200 may be one of electronic devices that can convert the cellular network into the Wi-Fi network and that include but are not limited to, for example, a wireless router, a computer, a cellular network-to-Wi-Fi wireless router, and a mobile phone.

Embodiments of this application disclose several methods for resolving adjacent-channel signal interference in a CPE device. For ease of understanding, the following describes an adjacent-channel interference problem in the CPE device 200.

Figure 1B:
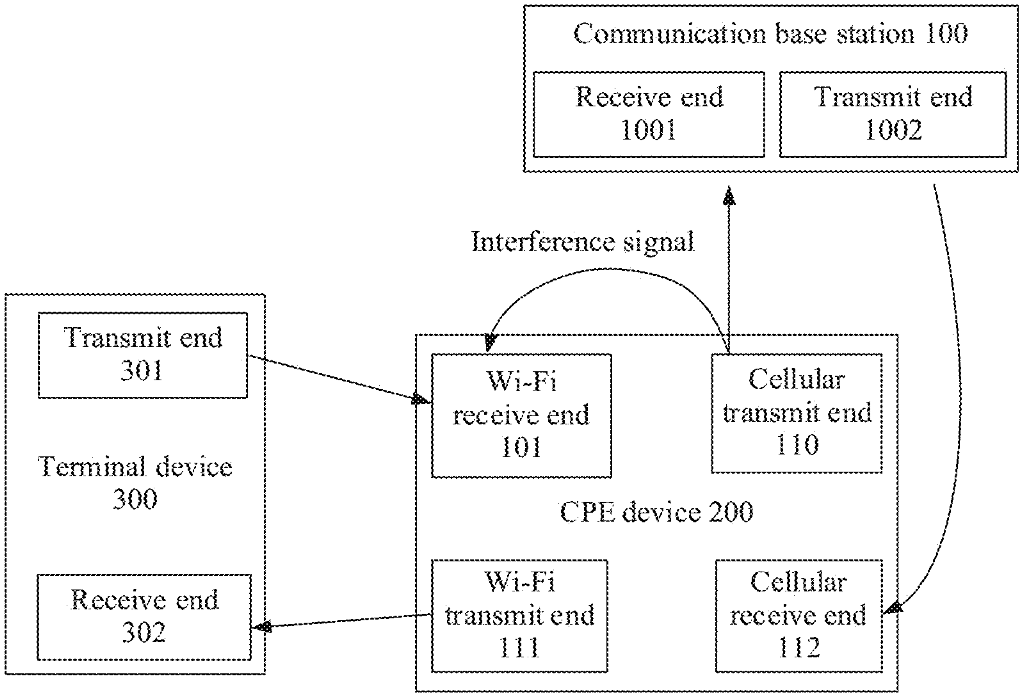
FIG. 1*b* is a schematic diagram of a process in which a CPE device 200 converts a cellular signal into a Wi-Fi signal according to an embodiment of this application.

Normally, a working process in which the CPE device 200 converts a cellular signal into a Wi-Fi signal is shown in FIG. 1*b*.

An internet access process of the terminal device 300 includes two processes: sending an internet access signal and receiving a network signal. A process in which the terminal device 300 sends the internet access signal and the CPE device 200 uploads the internet access signal to the communication base station 100 is referred to as a signal uplink process. A process in which the communication base station 100 backhauls the cellular network signal and the CPE device 200 delivers the cellular network signal to the terminal device 300 is referred to as a signal downlink process.

In the signal uplink process, a transmit end 301 of the terminal device 300 sends the internet access signal (namely, the Wi-Fi signal), and a Wi-Fi receive end 101 in the CPE device 200 receives the internet access signal. The Wi-Fi signal is demodulated by using a Wi-Fi modem 105 in the CPE device 200, and then modulated into a cellular signal by using a cellular network modem 106. The cellular signal is sent by a cellular transmit end 110 in the CPE device, and is received by a receive end 1001 of the communication base station 100.

In the signal downlink process, a transmit end 1002 of the communication base station 100 sends the cellular signal, and a cellular receive end 112 in the CPE device 200 receives the cellular signal. The cellular signal is demodulated by using the cellular network modem 106 in the CPE device 200, and then modulated into the Wi-Fi signal by using the Wi-Fi modem 105. The Wi-Fi signal is sent by a Wi-Fi transmit end 11 in the CPE device, and is received by a receive end 302 of the terminal device 300.

However, in an actual signal uplink process, because the cellular transmit end 110 in the CPE device 200 and the Wi-Fi receive end 101 in the CPE device 200 do not work in an ideal state, for example, when radiation power of transmit power of the cellular transmit end 110 in the CPE device 200 is not attenuated enough and leaks into a receive frequency band of the Wi-Fi receive end 101 in the CPE device 200, the radiation power together with a desired signal is received by the Wi-Fi receive end 101 after passing through a filter, and becomes an interference signal shown in FIG. 1*b*. As a result, a block error rate or bit error rate at the Wi-Fi receive end increases, causing adjacent-channel interference. That is, in the CPE device 200, the cellular transmit end 110 causes adjacent-channel interference to the Wi-Fi receive end 101. Due to adjacent-channel interference, both a signal-to-noise ratio and sensitivity of the Wi-Fi receive end 101 decrease. If the interference signal is too strong, blocking interference may even occur at the Wi-Fi receive end 101, causing communication interruption.

As described above, the adjacent-channel interference problem in the CPE device 200 mainly occurs in the signal uplink process.

Figure 1C:
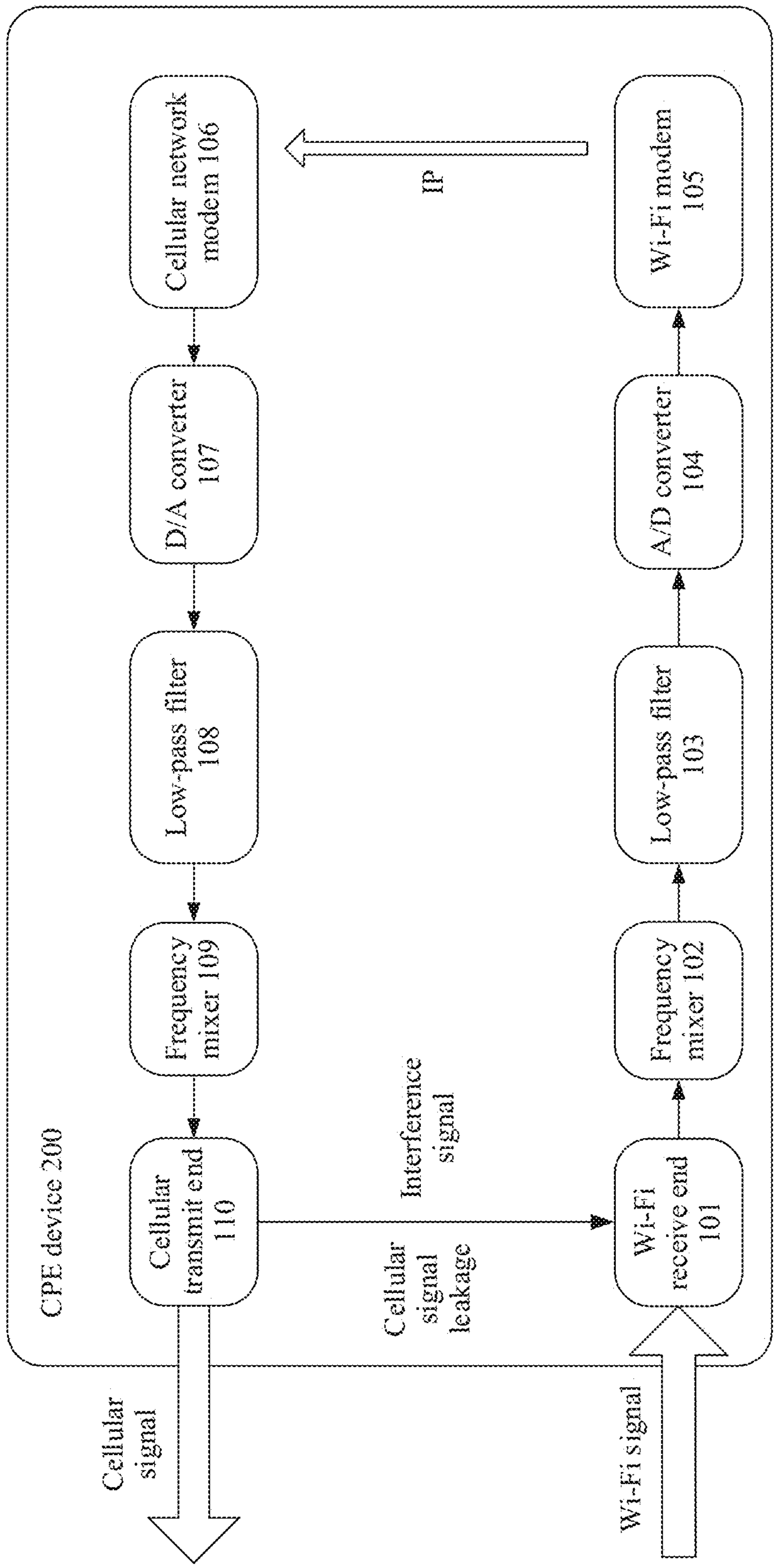
FIG. 1*c* is a schematic flowchart of a structure of a CPE device 200 in an uplink communication process according to an embodiment of this application.

FIG. 1*c* shows related components in the existing CPE device 200 that participate in the signal uplink process. As shown in FIG. 1*c*, the related components in the CPE device 200 in the signal uplink process include: the Wi-Fi receive end 101, a frequency mixer 102, a low-pass filter (Low-pass Filter, LPF) 103, an analog-to-digital (A/D) converter 104, the Wi-Fi modem 105, the cellular network modem 106, a digital-to-analog (D/A) converter 107, a low-pass filter 108, a frequency mixer 109, and the cellular transmit end 110.

The Wi-Fi receive end 101 is configured to receive the Wi-Fi signal sent by the transmit end 301 of the terminal device 300. The Wi-Fi receive end 101 is also referred to as a Wi-Fi receiver, and the Wi-Fi signal received by the Wi-Fi receive end 101 is an analog signal.

The frequency mixer 102 is configured to adjust a frequency of the Wi-Fi signal received by the Wi-Fi receive end 101 and output the Wi-Fi signal. The frequency mixer 102 is configured to convert a frequency of an input signal into another frequency for output, and a frequency of an output signal is equal to a sum of frequencies of two input signals, a difference of the frequencies of two input signals, or a combination of other proportions of the two. Generally, the frequency mixer is configured to generate an intermediate frequency signal.

The low-pass filter 103 is configured to filter out a signal whose frequency is higher than a cutoff frequency in the Wi-Fi signal. Therefore, the low-pass filter 103 is also referred to as a high-frequency shear filter or a treble cancellation filter. For example, a Butterworth filter and a Chebyshev filter are common low-pass filters. The Butterworth filter adopts a Butterworth transfer function. The Butterworth filter has stable amplitude-frequency characteristics both inside and outside the passband, but has a long transition band, in which distortion is easily caused. The Chebyshev filter adopts a Chebyshev transfer function. Compared with the Butterworth filter, the Chebyshev filter has a narrow transition band, but unstable internal amplitude-frequency characteristics.

The A/D converter 104 is configured to convert the Wi-Fi signal from the analog signal into a digital signal.

The Wi-Fi modem 105 is configured to demodulate the digital signal, obtained by converting the Wi-Fi signal by the A/D converter 104, and translate the digital signal into a language applicable to the internet protocol (Internet Protocol, IP), to interact with the cellular network modem 106.

The cellular network modem 106 is configured to read useful information in the Wi-Fi signal demodulated by the Wi-Fi modem 105, and modulate the useful information into a digital cellular baseband signal.

The D/A converter 107 converts the digital cellular baseband signal modulated by the cellular network modem 106 into an analog cellular baseband signal.

The low-pass filter 108 is configured to filter out a signal whose frequency is higher than a cutoff frequency in the analog cellular baseband signal.

The frequency mixer 109 is configured to adjust a frequency of the analog cellular baseband signal filtered out by the low-pass filter 108 and output the analog cellular baseband signal.

The cellular transmit end 110 is configured to transmit, to the receive end 1001 of the communication base station 100, the cellular signal processed by the low-pass filter 108 and the frequency mixer 109.

An area before the A/D converter 104 and after the D/A converter 107 is an area in which the analog signal is located, and is referred to as an analog domain. An area after the A/D converter 104 and before the D/A converter 107 is an area in which the digital signal is located, and is referred to as a digital domain.

The cellular signal sent by the cellular transmit end 110 is a high-frequency signal compared with the Wi-Fi signal. However, as described above, due to imperfect frequency selection of a transmitter of the cellular transmit end 110 and a receiver of the Wi-Fi receive end 101, cellular signal leakage occurs in the cellular signal sent by the cellular transmit end 110. A leaked cellular signal is received by the Wi-Fi receive end 101 as an interference signal.

For how to cancel the interference signal, some embodiments of this application provide some anti-interference methods. For example, an interference signal cancellation circuit is designed to be added in the CPE device 200, to cancel the interference signal on a Wi-Fi link; or a main controller module is designed in the CPE device 200, so that a Wi-Fi frequency hopping policy is obtained based on a detection or learning result of the main controller module and sent to a Wi-Fi link for the Wi-Fi link to camp on or perform frequency hopping to an appropriate channel for continue working, thereby achieving an anti-interference objective. In the solutions in embodiments of this application, an interference situation can be evaluated more accurately, anti-interference can be better implemented when a bandwidth configured in a new radio (New Radio, NR) is large, demodulation performance of the Wi-Fi link is improved, and quality of an entire communication link and user experience are improved.

The following describes in detail the specific technical solutions for resolving the adjacent-channel interference problem in this application with reference to embodiments.

Embodiment 1

In this embodiment, an anti-interference circuit for cancelling an interference signal is designed to be added in a CPE device 200, to achieve an anti-interference objective.

Figure 2A:
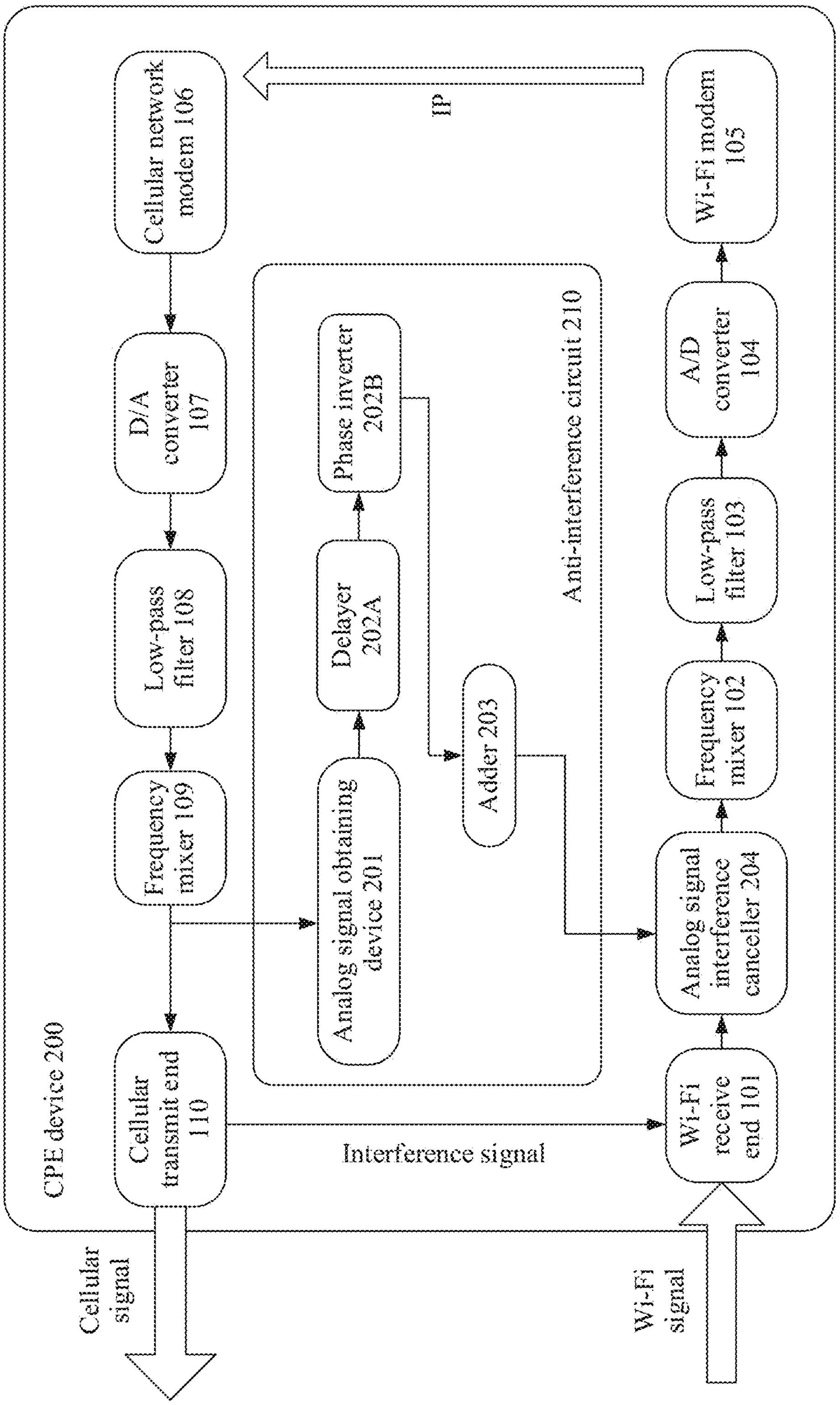
FIG. 2*a* is a schematic diagram of a structure of a CPE device 200 according to an embodiment of this application.
Figure 2B:
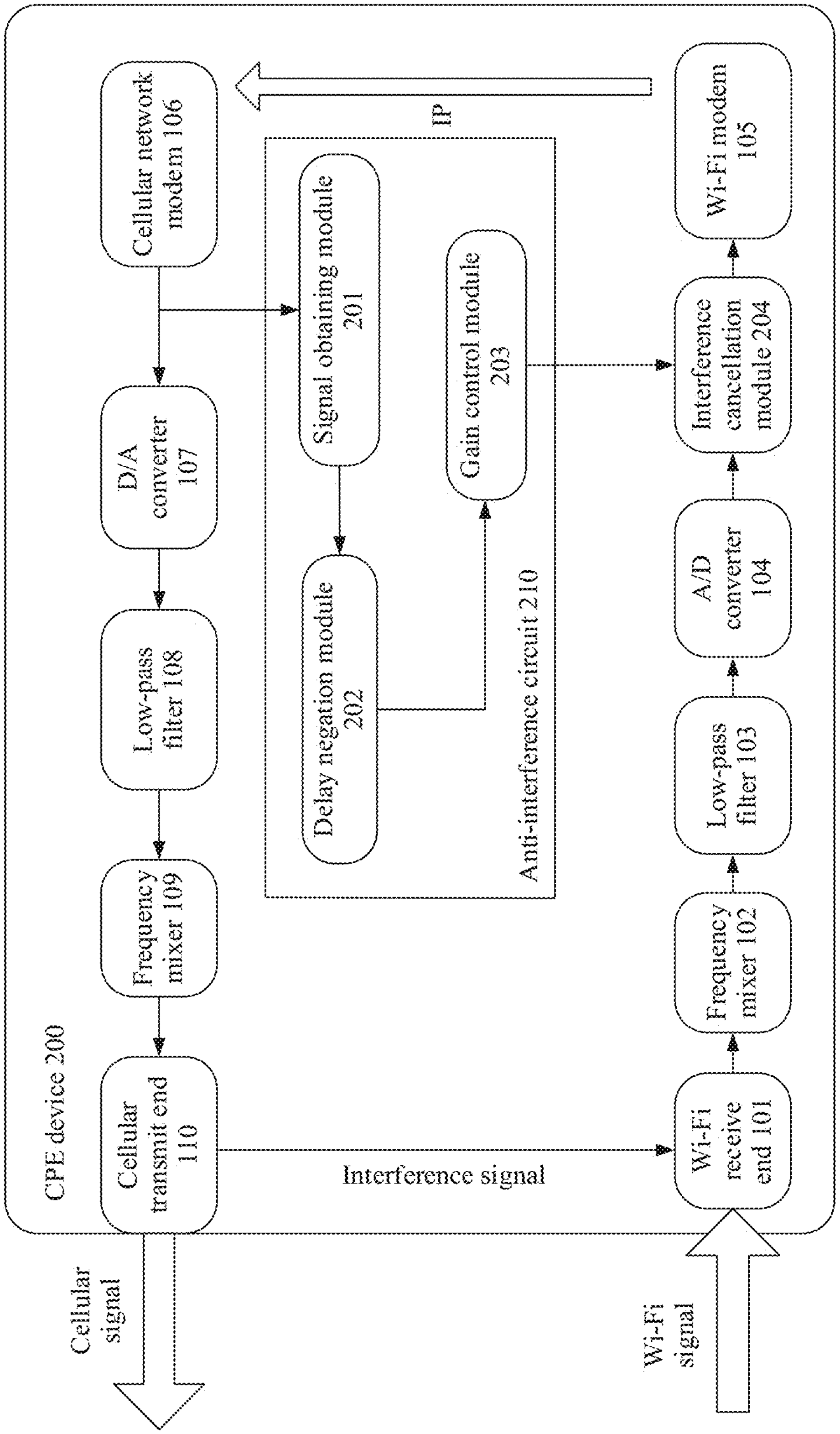
FIG. 2*b* is a schematic diagram of a structure of a CPE device 200 according to an embodiment of this application.

FIG. 2*a* and FIG. 2*b* respectively show two system structures in which the anti-interference circuit 210 is added in the CPE device 200 to achieve the anti-interference objective. FIG. 2*a* is a diagram of a system structure for cancelling the interference signal in an analog domain, and FIG. 2*b* is a diagram of a system structure for cancelling the interference signal in a digital domain.

Specifically, FIG. 2*a* is improved on the basis of FIG. 1*c*. The anti-interference circuit 210 for cancelling the interference signal is added in FIG. 2*a*. The anti-interference circuit 210 includes an analog signal obtaining device 201, a delayer 202A, a phase inverter 102B, an adder 203, and an analog signal interference canceller 204.

When the anti-interference circuit 210 is designed, because the interference signal is a cellular signal transmitted by a cellular transmit end 110, a delay needs to be considered. To be specific, in an uplink communication process, there are delays for different duration after the cellular signal is transmitted by the cellular transmit end 110 and before the cellular signal transmitted by the cellular transmit end 110 is received by a Wi-Fi receive end 101 in a Wi-Fi link and then causes adjacent-channel interference. In addition, an antenna gain needs to be considered. To be specific, in the uplink communication process, when the cellular signal sent by the cellular transmit end 110 is received by the Wi-Fi receive end 101 in the Wi-Fi link and then causes adjacent-channel interference, the interference signal or the cellular signal needs to be sent through a transmitter antenna at the cellular transmit end 110 and a receiver antenna at the Wi-Fi receive end 101. If a signal obtained before the cellular transmit end 110 is used as the interference signal, compared with an actual interference signal, the obtained signal lacks the antenna gain generated through the antenna. Therefore, a cellular signal obtained by the analog signal obtaining device 201 needs to be correspondingly delayed and gained.

When the anti-interference circuit 210 is disposed in the analog domain, for example, as shown in FIG. 2*a*, the analog signal interference canceller 204 is disposed between the Wi-Fi receive end 101 and a frequency mixer 102 in the Wi-Fi link, to cancel the interference signal in the analog domain of the Wi-Fi link. Correspondingly, the analog signal obtaining device 201 is electrically connected between a frequency mixer 10 and the cellular transmit end 110 to obtain an analog cellular signal.

It may be understood that the analog domain of the Wi-Fi link is a part of the analog domain on the Wi-Fi link. For example, the analog domain includes components and a connection line between the Wi-Fi receive end 101 and an A/D converter 104.

As shown in FIG. 2*a*, the analog signal obtaining device 201 is configured to obtain an analog cellular signal Si(t) after the signal passes through a frequency mixer 109 at time t of a time node between the frequency mixer 109 and the cellular transmit end 110 on a cellular link.

The delayer 202A is configured to perform delay processing on the obtained analog cellular signal Si(t), and the phase inverter 202B is configured to perform phase inversion processing on the obtained analog cellular signal Si(t).

For example, after the delayer 202A and the phase inverter 202B respectively perform delay processing and phase inversion processing on the analog cellular signal Si(t) obtained by the analog signal obtaining device 201, a change of the analog cellular signal Si(t) is shown in Formula (1):

$$S_p(t)=-S_i(t+\tau) \tag{1}$$

$S_p(t)$ indicates a delayed and phase-inverted analog cellular signal, and τ is signal transfer delay duration from the frequency mixer 109 in the cellular link to the Wi-Fi receive end 101 in the Wi-Fi link. The phase inverter 202B performs phase inversion processing on the analog cellular signal $S_i(t)$ to cancel the interference signal.

It may be understood that, when the anti-interference circuit 210 is disposed at different locations, values of the signal transfer delay duration T are also different.

The adder 203 is configured to perform gain adjustment on the analog cellular signal $S_p(t)$ processed by the delayer 202A and the phase inverter 202B.

$$S_g(t)=kS_p(t)=-kS_i(t+\tau) \tag{2}$$

$S_g(t)$ indicates an analog cellular signal obtained through gain adjustment (that is, equivalent to an out of phase signal of an interference signal received by the Wi-Fi receive end 101), k indicates a gain factor, k=a*b, a is a gain of a transmit antenna of the cellular transmit end 110, b is a gain of a receive antenna at the Wi-Fi receive end 101, and a and b can be calculated by using the following antenna gain calculation Formula (4), and are related to a configuration of an antenna.

It may be understood that the antenna gain is a ratio of power density of an actual antenna, under a condition that input powers are equal, to power density of a signal generated by an ideal radiating element at a same point in space. It quantitatively describes a degree to which an antenna intensively radiates an input power.

In actual application, even if an antenna is concentrated in a direction, the antenna still has different gains in all directions of space, and the antenna gain is generally a gain in a direction where a maximum gain is generated. Therefore, the antenna gain a in a maximum gain direction of the transmit antenna of the cellular transmit end 110 and the antenna gain b in a maximum gain direction of the receive antenna of the Wi-Fi link may be calculated by using the following Formula (5):

$$G = 10\,lg\frac{P_2}{P_1} \quad (3)$$

G is an antenna gain in the maximum gain direction, $P_2$ is an ideal radiating element power in the maximum gain direction, and $P_1$ is an actual antenna input power in the maximum gain direction.

Therefore, formulas for calculating a and b may be as follows:

$$a = 10lg\frac{P_{a2}}{P_{a1}} \quad (4)$$

$$b = 10lg\frac{P_{b2}}{P_{b1}} \quad (5)$$

$P_{a2}$ is an ideal radiating element power in the maximum gain direction of the transmit antenna of the cellular transmit end 110, $P_{a1}$ is an actual antenna input power in the maximum gain direction of the transmit antenna of the cellular transmit end 110, $P_{b2}$ is an ideal radiation element power in the maximum gain direction of the receive antenna of the Wi-Fi receive end 101, and $P_{b1}$, is an actual antenna input power in the maximum gain direction of the receive antenna of the Wi-Fi receive end 101.

Further, a calculation formula for obtaining a gain factor k is as follows:

$$k = a \times b = 100lg\frac{P_{a2}}{P_{a1}} \times lg\frac{P_{b2}}{P_{b1}} \quad (6)$$

It may be understood that, the parameter gain factors k and τ are closely related parameters of the device, and may be configured inside the CPE device 200 after hardware measurement is completed before delivery. The gain factor k may be calculated by using Formula (6), and is configured in the adder 203A of the anti-interference circuit 210. τ is obtained based on an access location of the anti-interference circuit 210 in actual application. For example, τ is generally 1 to 10 ns, and may be preset in the delayer 202A when the CPE device 200 is delivered from the factory.

The analog signal interference canceller 204 is configured to cancel a cellular network signal $S_g(t)$ obtained through gain adjustment or an interference signal $kS_i(t+\tau)$ in the received signal of the Wi-Fi link, or cancel the interference signal $kS_i(t+\tau)$ in the received signal of the Wi-Fi link.

It may be understood that the signal received by the Wi-Fi receive end 101 in the Wi-Fi link includes a desired Wi-Fi signal and the interference signal. Based on the foregoing design consideration of the anti-interference circuit 210, it may be understood that the interference signal can be equally represented as $kS_i(t+\tau)$. Therefore, the signal received by the Wi-Fi receive end 101 may be expressed as:

$$S_r(t)=S_w(t)+kS_i(t+\tau) \quad (7)$$

$S_w(t)$ is the desired Wi-Fi signal of the Wi-Fi link, and $kS_i(t+\tau)$ is the interference signal.

The analog signal interference canceller 204 obtains a signal S(t) through interference cancellation:

$$S(t)=S_r(t)+S_g(t)=S_w(t)+kS_i(t+\tau)-kS_i(t+\tau)=S_w(t) \quad (8)$$

Therefore, it may be understood that the signal S(t) obtained through interference cancellation is the desired signal $S_w(t)$ of the Wi-Fi link through transformation of Formula (3).

For example, the analog signal interference canceller 204 may be an interference cancellation circuit designed to be added. The interference signal is cancelled from the Wi-Fi signal processed by the analog signal interference canceller 204.

In the foregoing solution, the analog cellular signal Si(t) obtained by the analog signal obtaining device 201 at the time t of the time node on the cellular link may be obtained between the frequency mixer 109 and the cellular transmit end 110 on the cellular link. The analog signal interference canceller 204 is correspondingly disposed between the Wi-Fi receive end 101 and the frequency mixer 102 on the Wi-Fi link. Correspondingly, the delay duration τ is delay duration in which the analog cellular signal Si(t) passes through the cellular transmit end 110 and the Wi-Fi receive end 101.

It may be understood that, in some other embodiments, the cellular signal $S_i(t)$ obtained by the analog signal obtaining device 201 at the time t of the time node on the cellular link may alternatively be obtained between the frequency mixer 109 and the low-pass filter 108 on the cellular link. The analog signal interference canceller 204 is correspondingly disposed between the frequency mixer 102 and the low-pass filter 103 on the Wi-Fi link. The delay duration τ is correspondingly delay duration in which the analog cellular signal $S_i(t)$ passes through the frequency mixer 109, the cellular transmit end 110, the Wi-Fi receive end 101, and the frequency mixer 102. In some other embodiments, the analog cellular signal Si(t) obtained by the analog signal obtaining device 201 at the time t of the time node on the cellular link may alternatively be obtained between the low-pass filter 108 and the D/A converter 107 on the cellular link. The analog signal interference canceller 204 is correspondingly disposed between the low-pass filter 103 and the A/D converter 104 on the Wi-Fi link. Correspondingly, the delay duration T is delay duration in which the analog cellular signal $S_i(t)$ passes through the low-pass filter 108, the frequency mixer 109, the cellular transmit end 110, the Wi-Fi receive end 101, the frequency mixer 102, and the low-pass filter 103. In this way, the interference signal may correspond to a designed signal cancellation value, to cancel the interference signal and achieve an anti-interference objective.

To achieve a better anti-interference effect, the analog signal obtaining device 201 preferably obtains an analog cellular signal $S_i(t)$ passing through the low-pass filter 108, mainly because noise of the analog cellular signal $S_i(t)$ passing through the low-pass filter 108 is smaller, and an effect of cancelling the interference signal is better.

The technical solution shown in FIG. 2*b* is now described. FIG. 2*b* is improved on the basis of FIG. 1*c*. The anti-interference circuit 210 for cancelling the interference signal is added in FIG. 2*b*. The anti-interference circuit 210 includes a signal obtaining module 201, a delay negation module 202, a gain control module 203, and an interference cancellation module 204. The signal obtaining module 201 is a digital circuit having a function of performing discrete sampling on a digital signal. The delay negation module 202 is a digital circuit having a function of performing delay and inversion on the digital signal. The gain control module 203 includes a digital circuit having a function of performing gain processing on the digital signal. The interference cancellation module 204 is a digital circuit having a function of cancelling the digital signal.

The interference cancellation module 204 is disposed between the A/D converter 104 and the Wi-Fi modem 105, to cancel the interference signal in the digital domain of the Wi-Fi link. Correspondingly, the signal obtaining module 201 is electrically connected between the cellular network modem 106 and the D/A converter 107 to obtain a digital cellular signal.

It may be understood that the digital domain of the Wi-Fi link is a part of the digital domain on the Wi-Fi link. As shown in FIG. 2*b*, the signal obtaining module 201 obtains a digital cellular signal $S_i(n)$ between the cellular network modem 106 and the D/A converter 107, where n is a discrete sampling point of the digital signal. The delay negation module 202 performs negation and delay on the signal.

$$S_p(n)=-S_i(n+\tau_n ts) \quad (9)$$

ts is a sampling period, and $\tau_n$ is a quantity of signal transfer delay sampling points from the D/A converter 107 to the A/D converter 104 in the cellular link.

The gain control module 203 is configured to perform gain adjustment on a signal $S_p(n)$. Refer to the following formula:

$$S_g(n)=kS_p(n)=-kS_i(n+\tau_n ts) \quad (10)$$

$S_g(n)$ indicates a cellular signal obtained through gain adjustment (that is, equivalent to an out of phase signal after the interference signal received by the Wi-Fi receive end 101 is transferred to the A/D converter 104), k indicates a gain factor, k=a*b, a is a gain of a transmit antenna of the cellular link, b is a gain of a receive antenna of the Wi-Fi link, and a and b may be calculated by using Formula (3) to Formula (5). Further, a value of the gain factor k may be calculated by using Formula (6).

It may be understood that, the parameter gain factors k and $\tau_n$ are closely related parameters of the device, and may be configured inside the CPE device 200 after hardware measurement is completed before delivery. The gain factor k may be calculated according to Formula (6), and is configured in the gain control module 203 of the anti-interference circuit 210. $\tau_n$ is obtained based on an access location of the anti-interference circuit 210 in actual application. For example, $\tau_n$ts is generally 1 to 10 ns, and may be preset in the delay negation module 202 when the CPE device 200 is delivered from the factory.

The interference cancellation module 204 is configured to cancel a cellular network signal $S_g(n)$ obtained through gain adjustment or an interference signal $kS_i(n+\tau_n ts)$ in the received signal of the Wi-Fi link, or cancel an interference signal $kS_i(n+\tau_n ts)$ in the received signal of the Wi-Fi link.

It may be understood that the signal received by the Wi-Fi receive end 101 in the Wi-Fi link includes a desired Wi-Fi signal and the interference signal. Based on the foregoing design consideration of the anti-interference circuit 210, it may be understood that the interference signal can be equally represented as $kS_i(n-\tau_n ts)$. Therefore, the signal received by the Wi-Fi receive end 101 and transferred to the A/D converter 104 may be expressed as:

$$S_r(n)=S_w(n)+kS_i(n+\tau_n ts) \quad (11)$$

$S_w(n)$ is the desired Wi-Fi signal of the Wi-Fi link, and $kS_i(n-\tau_n ts)$ is the interference signal.

The interference cancellation module 204 obtains a signal S(n) through interference cancellation:

$$S(n)=S_r(n)+S_g(n)=S_w(n)+kS_i(n+\tau_n ts)-kS_i(n+\tau_n ts)=S_w(n) \quad (12)$$

Therefore, it may be understood that the signal S(n) obtained through interference cancellation is the desired signal $S_w(n)$ of the Wi-Fi link through transformation of Formula (3).

For example, the interference cancellation module 204 may be an interference cancellation digital circuit added by design. The interference signal is cancelled from the Wi-Fi signal processed by the interference cancellation module 204.

In the solution of this embodiment, the anti-interference circuit 210 is added inside the CPE device 200 to cancel the interference signal from the Wi-Fi link, to achieve the anti-interference objective. The following describes another embodiment in which a main controller module is designed inside the CPE device 200 to achieve an anti-interference objective.

Embodiment 2

In this embodiment, a main controller module is designed inside a CPE device 200 to evaluate, in advance, a degree of adjacent-channel interference to a current working channel on a Wi-Fi link, and determine whether the current working channel meets a working condition. When a current working channel does not meet a working condition, the main controller module can evaluate, in advance, a degree of adjacent-channel interference to another channel on a Wi-Fi link, and finally select a candidate channel that meets the working condition to work, to achieve an objective of anti-adjacent channel interference.

Figure 3:
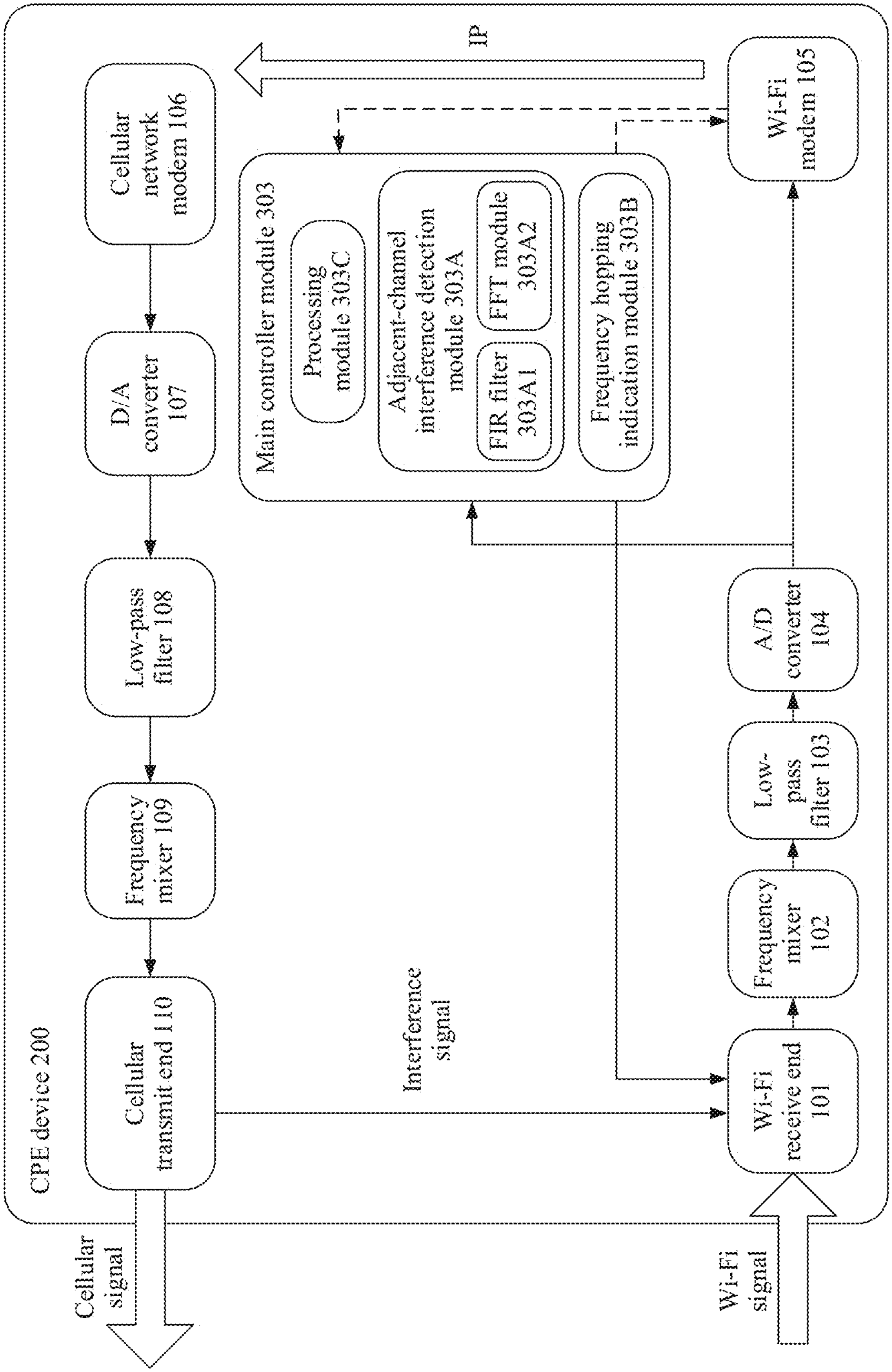
FIG. 3 is a schematic diagram of a structure of a CPE device 200 according to another embodiment of this application.

Specifically, FIG. 3 shows a schematic structure of the CPE device 200 in which the main controller module is designed to implement anti-interference. As shown in FIG. 3, the main controller module 303 is added on the basis of FIG. 1*c*. An adjacent-channel interference detection module 303A, a frequency hopping indication module 303B, and a processing module 303C are disposed in the main controller module 303. The adjacent-channel interference detection module 303A includes a finite impulse response (Finite Impulse Response, FIR) filter 303A1 and a fast Fourier transform (fast Fourier transform, FFT) module 303A2.

The adjacent-channel interference detection module 303A evaluates an interference degree in a channel, which may be indicated by adjacent-channel interference strength. The adjacent-channel interference strength may be determined by using a ratio of high-frequency signal energy to low-frequency signal energy in a signal. The reasons are as follows: when there is no adjacent-channel interference in a working channel on the Wi-Fi link, a ratio of high-frequency signal energy to low-frequency signal energy in the channel is stable near a fixed value. The fixed value is an average value of ratios of high-frequency signal energy to low-frequency signal energy in signals in the channel, and is set to an adjacent-channel interference strength threshold within the channel.

When a working channel on the Wi-Fi link is interfered by an adjacent channel, high-frequency signal energy in the interference signal channel increases sharply due to addition of a high-frequency interference signal. As a result, a ratio of high-frequency signal energy to low-frequency signal energy in a signal in the channel becomes excessively large, and is even much greater than an adjacent-channel interference threshold in the channel. For example, when there is no adjacent-channel interference, the ratio of the high-frequency signal energy to the low-frequency signal energy in the working channel on the Wi-Fi link is 1.0 to 1.1. When the working channel is interfered by a leaked interference signal, the ratio of the high-frequency signal energy to the low-frequency signal energy in the working channel on the Wi-Fi link may increase sharply to 10.1 to 11.0. Therefore, the ratio of the high-frequency signal energy to the low-frequency signal energy may intuitively reflect a status of adjacent-channel interference to the working channel on the Wi-Fi link. To simplify calculation, the ratio of the high-frequency signal energy to the low-frequency signal energy may be used to indicate the adjacent-channel interference strength.

The high-frequency signal energy and the low-frequency signal energy in the signal may be calculated through filtering processing by the FIR filter 303A1, and then through fast Fourier transform calculation by the FFT module 303A2.

The FIR filter 303A1 is a digital low-pass filter circuit, and is configured to perform filtering processing on the digital Wi-Fi signal, to filter out a signal whose frequency is higher than a cutoff frequency in the digital Wi-Fi signal, so that the FFT module 303A2 can use the signal. Because filtering processing performed by a low-pass filter 103 on an analog Wi-Fi signal cannot completely filter out a high-frequency noise signal in a Wi-Fi signal, noise still exists in the Wi-Fi signal passing through the low-pass filter 103. To obtain a Wi-Fi signal with lower noise or even without noise, the Wi-Fi signal needs to be filtered again by the FIR filter 303A1.

The FFT module 303A2 is a digital function transformation calculation module, and is configured to perform fast Fourier transformation on a digital signal processed by the FIR filter 303A1, to obtain high-frequency signal energy and low-frequency signal energy in the digital signal.

Fast Fourier transform(FFT) is a general term of efficient and fast computing methods for computing discrete Fourier transform (Discrete Fourier Transform, DFT) by using a computer, and is briefly referred to as FFT. FFT is obtained by improving an algorithm of discrete Fourier transform based on odd, even, imaginary and real characteristics of discrete Fourier transform.

The basic idea of FFT is to decompose an original N-point sequence into a series of short sequences. Symmetric and periodic properties of an exponent factor in a DFT calculation formula are fully utilized to calculate corresponding DFTs of these short sequences. The DFTs are properly combined to achieve the objective of eliminating repeated calculation, reducing multiplication and simplifying a structure. When N is a prime number, the DFT calculation formula may be converted into a cyclic convolution, to further reduce a quantity of multiplications and improve a speed.

The general transformation formula of FFT is as follows:

$$X(k)=\sum_{n=0}^{N-1}x(n)W_N^{kn} \tag{13}$$

X(k) is Fourier transform thereof, x(n) is an input discrete digital signal, N is a quantity of sequence points, and k=0, 1, . . . , N−1, and $$W_N^{kn}=e^{-j2\pi/N}.$$

The high-frequency signal energy $E_a$ and the low-frequency signal energy $E_b$ are calculated as follows:

$$E_a=\sum_{k=Na}^{\frac{N}{2}-1}X(k)^2 \tag{14}$$

$$E_b=\sum_{k=0}^{Nb-1}X(k)^2 \tag{15}$$

Na is a high-frequency start point, and Nb is a low-frequency cut-off point. A method for obtaining a value is Na=Nb=N/4.

Figure 4:
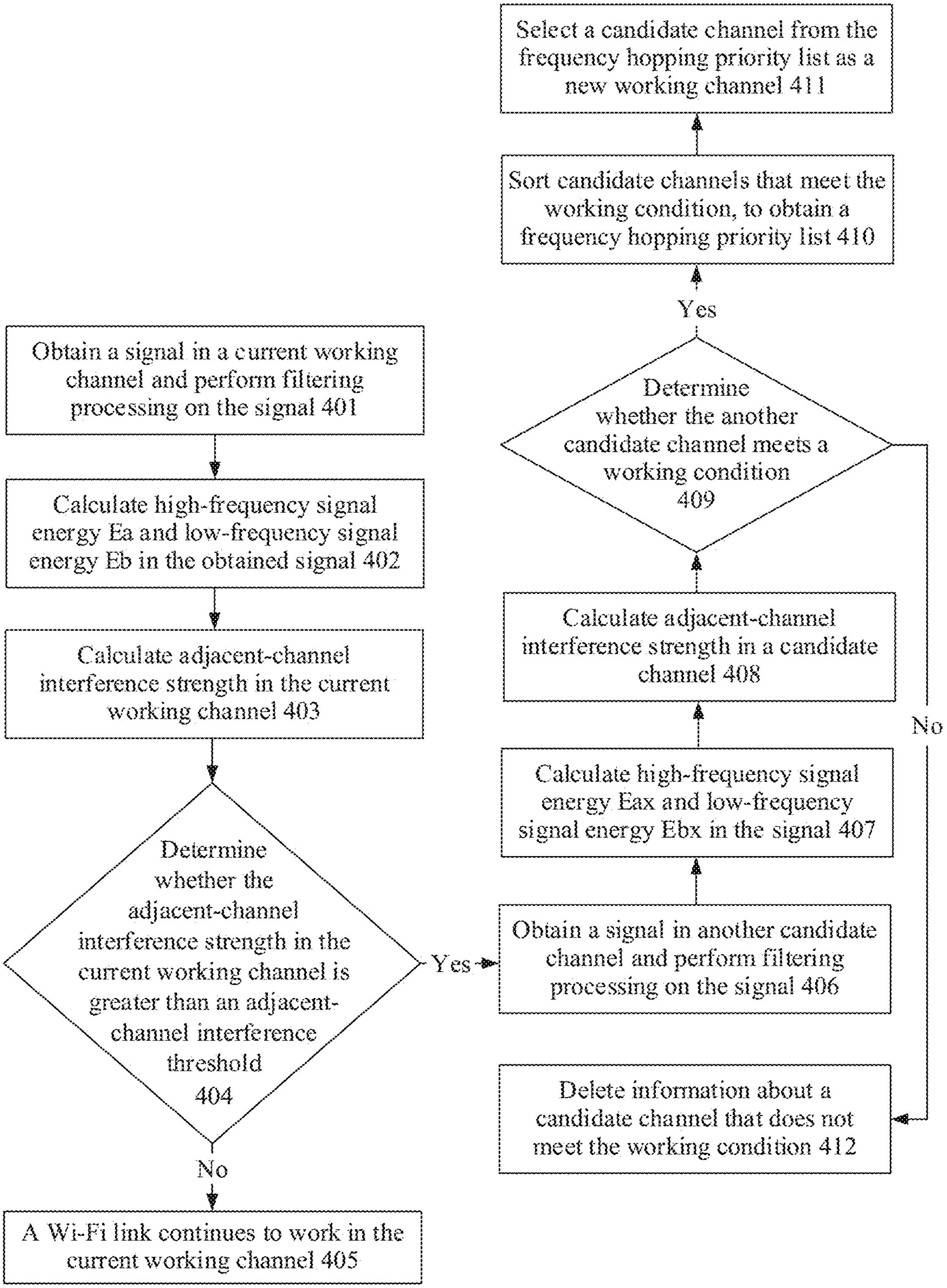
FIG. 4 is a schematic flowchart of an anti-interference method in a CPE device 200 in FIG. 3.

The following specifically describes a main process of implementing anti-interference by the main controller module 303 based on the foregoing descriptions and with reference to FIG. 4. The process includes 401 to 412.

401: The adjacent-channel interference detection module 303A obtains a signal in the current working channel on the Wi-Fi link, and performs filtering processing on the signal.

Signals in the current working channel include a Wi-Fi signal and an interference signal Specifically, the adjacent-channel interference detection module 303A obtains a digital signal that passes through an A/D converter 104 and that is in a current working channel i on the current Wi-Fi link, and the FIR filter 303A1 performs filtering processing the obtained signal.

402: The adjacent-channel interference detection module 303A calculates the high-frequency signal energy $E_a$ and the low-frequency signal energy $E_b$ in the obtained signal.

The adjacent-channel interference detection module 303A performs fast Fourier transform on a signal filtered by the FFT module 303A2, to obtain the high-frequency signal energy $E_a$ and the low-frequency signal energy $E_b$ in the signal.

For calculations of the high-frequency signal energy $E_a$ and the low-frequency signal energy $E_b$, refer to Formula (13) to Formula (15) and related descriptions.

403: The adjacent-channel interference detection module 303A calculates adjacent-channel interference strength in the current working channel.

Specifically, the adjacent-channel interference strength may be obtained by calculating a ratio of the high-frequency signal energy $E_a$ to the low-frequency signal energy $E_b$ in a composite signal, and the adjacent-channel interference strength may be indicated by λ. The calculated adjacent-channel interference strength value λ is sent to the processing module 303C. A formula for calculating the adjacent-channel interference strength λ is:

$$\lambda=\frac{E_a}{E_b} \tag{16}$$

404: The processing module 303C determines whether the adjacent-channel interference strength in the current working channel is greater than an adjacent-channel interference threshold.

Specifically, the calculated adjacent-channel interference strength λ is compared with the adjacent-channel interference threshold $\lambda_i$ in the current working channel i. If λ is less than or equal to $\lambda_i$, it indicates that the degree of interference to the current working channel i is low, and then step 405 is performed. If λ is greater than $\lambda_i$, it indicates that the degree of interference to the current working channel i is high, and then step 406 is performed.

The adjacent-channel interference threshold $\lambda_i$ is set based on an average value of the adjacent-channel interference strength in the current working channel i. That is, the adjacent-channel interference threshold $\lambda_i$ of the current working channel i is equal to an average value of ratios of high-frequency signal energy passing through the current working channel i to low-frequency signal energy when there is no adjacent-channel interference in the current working channel i.

The adjacent-channel interference threshold $\lambda_i$ is impacted by a Wi-Fi standard (namely, a combination of parameters such as a Wi-Fi frequency, a bandwidth, and a transmit power). An adjacent-channel interference threshold of a working channel on the Wi-Fi link varies with the Wi-Fi standard. Generally, in a same Wi-Fi standard, adjacent-channel interference thresholds of working channels on the Wi-Fi link are generally the same.

For example, when there is no adjacent-channel interference on the current working channel i at a time point n in a Wi-Fi standard, high-frequency signal energy passing through the channel i is $E_{an}$, and low frequency signal energy passing through the channel i is $E_{bn}$. In this case, a formula for calculating the adjacent-channel interference strength $\lambda_n$ is as follows:

$$\lambda_n = \frac{E_{an}}{E_{bn}} \tag{17}$$

Adjacent-channel interference strength values of the channel i in the Wi-Fi standard at different time points n are calculated according to Formula (17), to obtain an adjacent-channel interference strength number sequence; $\{\lambda_i, \lambda_2, \ldots, \lambda_n\}$ in a time period t. A time point n is in the time period t. An average value of the adjacent-channel interference strength number sequence is calculated, and the calculated average value may be set to the adjacent-channel interference threshold $\lambda_i$ of the current working channel i.

405: The processing module 303C does not send a frequency hopping indication, so that the Wi-Fi link continues to work on the current working channel i.

406: The adjacent-channel interference detection module 303A obtains the signal in the another candidate channel and performs filtering processing on the signal.

The adjacent-channel interference detection module 303A obtains the signal in the another candidate channel in the Wi-Fi link, and performs filtering processing by using the FIR filter 303A1.

407: The adjacent-channel interference detection module 303A calculates high-frequency signal energy $E_{ax}$ and low-frequency signal energy $E_{bx}$ in the signal in the another candidate channel.

The adjacent-channel interference detection module 303A performs, by using the FFT module 303A2, fast Fourier transform on the signal that is in the another candidate channel and that is obtained by filtering processing, to obtain the high-frequency signal energy $E_{ax}$ and the low-frequency signal energy $E_{bx}$ in the signal.

408: The adjacent-channel interference detection module 303A calculates an adjacent-channel interference strength value $\lambda$ in the candidate channel, to evaluate a degree of interference in the candidate channel.

The adjacent-channel interference strength value $\lambda$ in the candidate channel is calculated with reference to Formula (16), and the calculated value $\lambda$ is sent to the processing module 303C.

409: The processing module 303C determines whether the another candidate channel meets the working condition. If the another candidate channel meets the working condition, step 410 is performed. If the another candidate channel does not meet the working condition, step 412 is performed.

The processing module 303C determines whether the adjacent-channel interference strength of the another candidate channel is less than or equal to the adjacent-channel interference threshold.

410: The processing module 303C sorts candidate channels that meet the working condition to obtain a frequency hopping priority list.

The processing module 303C sorts the candidate channels in ascending order or descending order of adjacent-channel interference strength, to obtain a sequence list of candidate channels, which is used as the frequency hopping priority list.

411: The processing module 303C selects a candidate channel from the frequency hopping priority list as a new working channel. This process ends.

The processing module 303C selects the candidate channel from the frequency hopping priority list as the new working channel. The candidate channel may be a candidate channel with minimum adjacent-channel interference strength in the frequency hopping priority list, or may be another candidate channel. This is not limited herein. For example, to make the Wi-Fi link work on a channel with less adjacent-channel interference as much as possible, the processing module 303C selects the candidate channel with the minimum adjacent-channel interference strength in the frequency hopping priority list as the working channel on the Wi-Fi link.

The processing module 303C sends a frequency of the selected candidate channel as a frequency hopping indication to the frequency hopping indication module 303B, and sends the frequency hopping indication to the Wi-Fi receive end 101 of the Wi-Fi link or the Wi-Fi modem 105 by using the frequency hopping indication module 303B. After receiving the frequency hopping indication, the Wi-Fi receive end 101 or the Wi-Fi modem sends a frequency hopping signal, indicating the Wi-Fi link to perform frequency hopping to the selected candidate channel to work.

The frequency is an absolute frequency value of a radio signal transmission frequency. It is generally a center frequency of a modulated signal. The frequency is a number of a fixed frequency.

A tiny digital signal processor is usually disposed in the Wi-Fi receive end 101 or the Wi-Fi modem, and is configured to identify a frequency hopping indication sent by the frequency hopping indication module 303B, convert a received frequency into a frequency hopping signal, and send the frequency hopping signal, indicating the Wi-Fi link to perform frequency hopping to the selected candidate channel to work.

In some embodiments, the Wi-Fi modem 105 may be used to indicate whether the Wi-Fi link successfully performs frequency hopping to the priority channel. Specifically, after the working channel on the Wi-Fi link performs frequency hopping to the priority channel that is selected by the processing module 503C and is suitable for working, the Wi-Fi modem 105 may collect statistics on a block error rate in a working channel after frequency hopping, and send the block error rate to the processing module 503C. The processing module 503C determines, based on the block error rate that is of the working channel after frequency hopping and collected by the Wi-Fi modem 105, whether frequency hopping succeeds. If frequency hopping fails, the Wi-Fi link still works on the channel before frequency hopping, and the working channel after frequency hopping is not selected within a period of time.

412: Delete information about a candidate channel that does not meet the working condition. This process ends.

To save a memory resource of the CPE device 200, the information about the candidate channel that does not meet the working condition may be deleted, and the information includes but is not limited to a frequency, bandwidth, transmit power, and the like of the candidate channel. In some other embodiments, the information about the candidate channel that does not meet the working condition may continue to be retained. This is not limited herein.

It may be understood that the main controller module 303 may be a central processing unit (Central Processing Unit, CPU), single-chip microcomputer (Microcontrollers), or DSP chip (Digital Signal Process, DSP) that has a storage processing function. The main controller module 303 can run a program to implement functions of the adjacent-channel interference detection module 303A, the frequency hopping indication module 303B, and the processing module 303C. Further, functions of the adjacent-channel interference detection module 303A are implemented by using the FIR filter 303A1 and the FFT module 303A2.

In this embodiment, the main controller module 303 is designed to evaluate, in advance, the degree of the adjacent-channel interference on the current working channel and another candidate channel on the Wi-Fi link, and then select to enable the Wi-Fi link to still work on the current working channel or to perform frequency hopping to another candidate channel with less adjacent-channel interference, to achieve the anti-interference objective. The following describes still another embodiment in which another main controller module is designed to achieve the anti-interference objective.

Embodiment 3

In an uplink signal communication process in a CPE device, when a cellular link sends a cellular signal by using different cellular parameters, interference to a Wi-Fi link is different, which is mainly reflected in different quality of signals received in each channel on the Wi-Fi link. For example, in a wireless network, a device (for example, a user terminal) may send data to another device (for example, a CPE device 200) by using a data block. Therefore, signal quality of each channel of a Wi-Fi transmit end may be determined based on a block error rate (Block Error Rate, BLER). In some other embodiments, the signal quality of each channel on the Wi-Fi link may alternatively be determined based on a bit error rate (Bit Error Rate, BER). A larger block error rate or bit error rate in each channel on the Wi-Fi link indicates poorer signal quality in each channel on the Wi-Fi link.

Therefore, in this embodiment of this application, a channel on which the Wi-Fi link is suitable for working is determined by collecting statistics on a correspondence between a cellular parameter used by the cellular link and quality of a Wi-Fi signal received in each channel on the Wi-Fi link.

It may be understood that the cellular parameter may mainly include a frequency, a bandwidth, a transmit power, and the like. Different cellular parameters can be simply understood as different combinations of parameters such as a frequency, a bandwidth, and a transmit power. There may be dozens, hundreds, or even thousands of combinations of parameters such as a frequency, a bandwidth, and a transmit power. Therefore, it may be understood that there may be several cellular parameters, which are not limited herein.

In addition, it may be understood that, in the CPE device 200, a signal received by a Wi-Fi receive end 101 is sent by block to a Wi-Fi modem 105. The Wi-Fi receive end 101 calculates one CRC (Cyclic Redundancy Check, cyclic redundancy check) by using data in a block, and sends the CRC along with the block to the Wi-Fi modem 105. The Wi-Fi modem 105 calculates one CRC based on the received data, and compares the CRC with a received CRC sent by the Wi-Fi receive end 101. If both CRCs are equal, the Wi-Fi modem 105 considers that the Wi-Fi modem 105 successfully receives correct data, and returns an acknowledgment character (Acknowledge character, ACK) to the Wi-Fi receive end 101. If both CRCs are not equal, the Wi-Fi modem 105 considers that the Wi-Fi modem 105 receives incorrect data, and returns a negative acknowledgment (Negative Acknowledge, NAK) character to the Wi-Fi receive end 101 to request the Wi-Fi receive end 101 to retransmit the block.

The block error rate is a percentage of error data blocks in all transmitted data blocks (only the data blocks transmitted for the first time) during signal transmission. Therefore, a formula for calculating the block error rate is as follows.

$$BLER = \frac{N_{cc}}{N} \tag{18}$$

N is a total quantity of transmitted data blocks, and $N_{cc}$ is a quantity of data blocks with check errors in the total quantity of transmitted data blocks.

The block error rate is an average value during long-term statistics collection and an important indicator that reflects network performance and quality of service. For example, in the CPE device 200, a value of a block error rate in each channel on the Wi-Fi link directly affects transmission quality and a transmission speed of a sound signal, an image channel, and the like in a process in which a user surfs the Internet by using a Wi-Fi network and communicates by using voice software and video software. As described above, when the cellular link sends the cellular signal by using different cellular parameters, block error rates in each channel on the Wi-Fi link are different, and the value of the block error rate in each channel on the Wi-Fi link is closely related to the cellular parameter.

Therefore, a cellular parameter (namely, a historical cellular parameter) used by the cellular link in a time period in the CPE device 200 and a block error rate (namely, a historical block error rate) in each channel on the Wi-Fi link may be collected, to obtain a value ofa historical block error rate in each channel on the Wi-Fi link under any historical cellular parameter. Historical block error rates of each channel on the Wi-Fi link under any historical cellular parameter in a time period are arranged in ascending order or in descending order to obtain a corresponding channel priority list. It can be learned that there is a correspondence between the historical cellular parameter and the channel priority list. In addition, the correspondence between the historical cellular parameter and the channel priority list is irrelevant to time.

The correspondence between the historical cellular parameter and the channel priority list may be a one-to-one correspondence or a many-to-one correspondence. Details are described in detail below. Correspondingly, the correspondence between the historical cellular parameter and the channel priority list is of important reference value in selection of a working channel on the Wi-Fi link.

Figure 5:
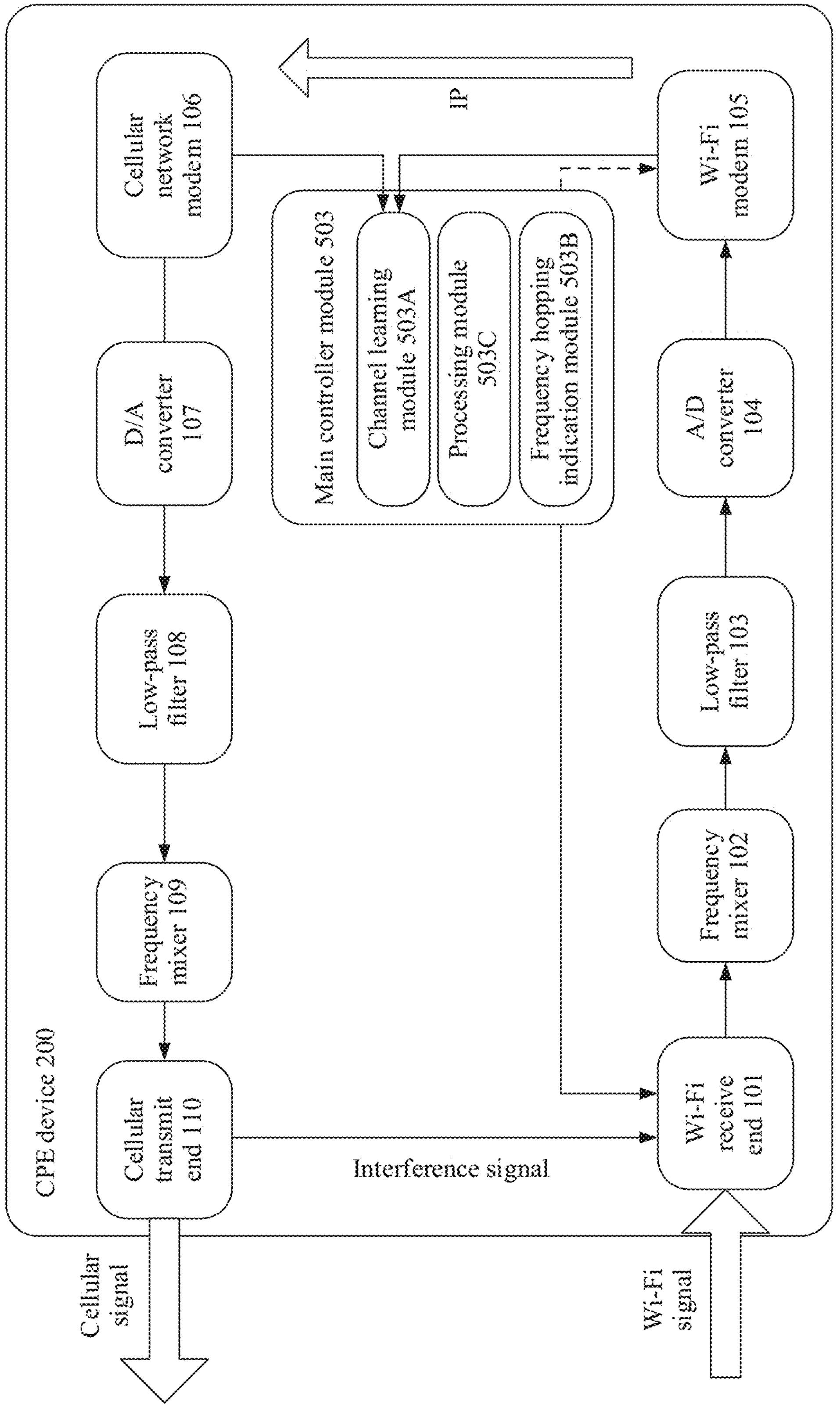
FIG. 5 is a schematic diagram of a structure of a CPE device 200 according to another embodiment of this application.
Figure 6:
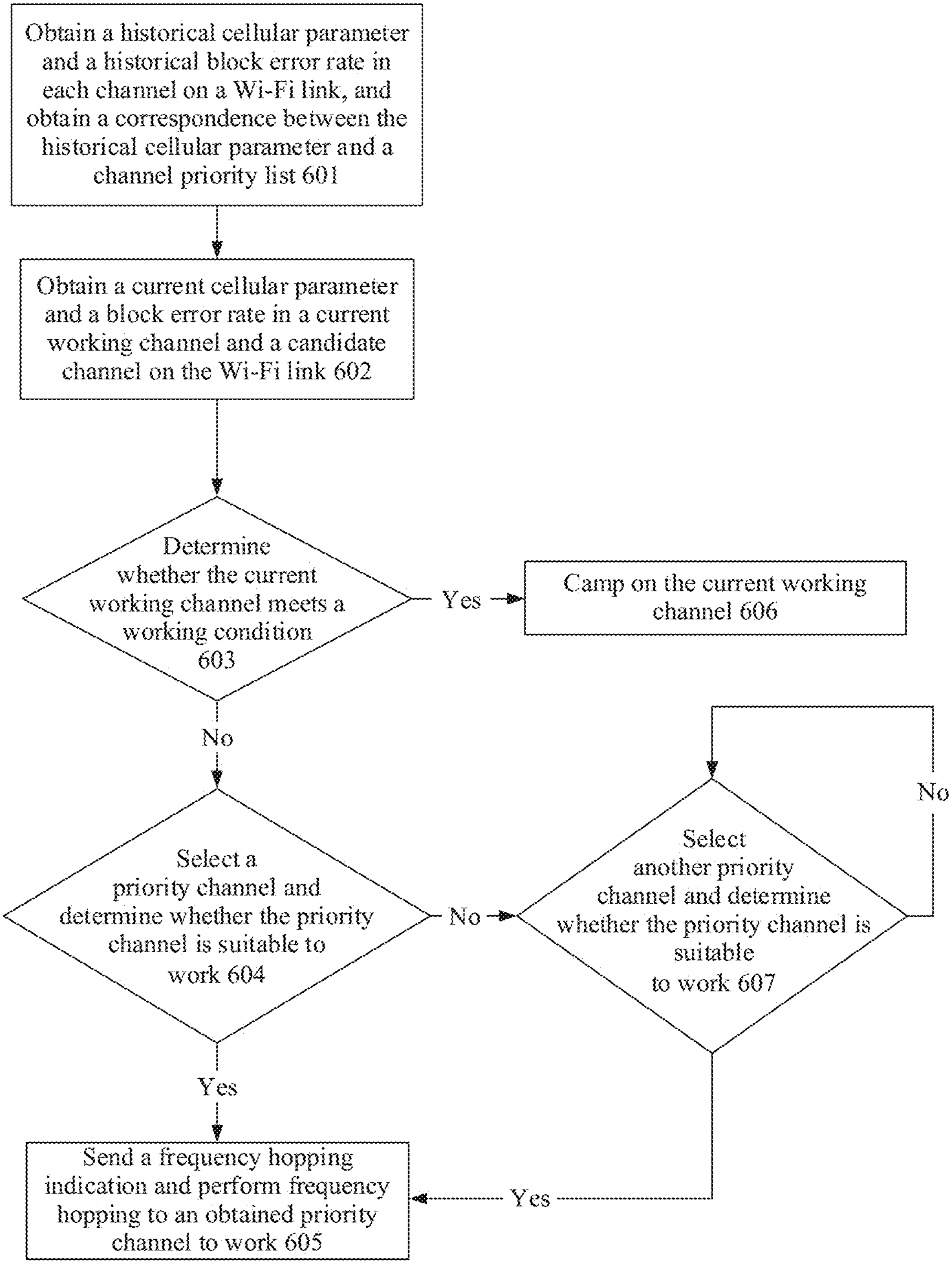
FIG. 6 is a schematic flowchart of an anti-interference method in a CPE device 200 in FIG. 5.

FIG. 5 shows an example of a structure of the CPE device 200 designed with the main controller module 503. FIG. 5 is improved on the basis of FIG. 1*c*. The main controller module 503 is added in FIG. 5. A channel learning module 503A, a frequency hopping indication module 503B, and a processing module 503C are disposed in the main controller module 503.

Figure 7:
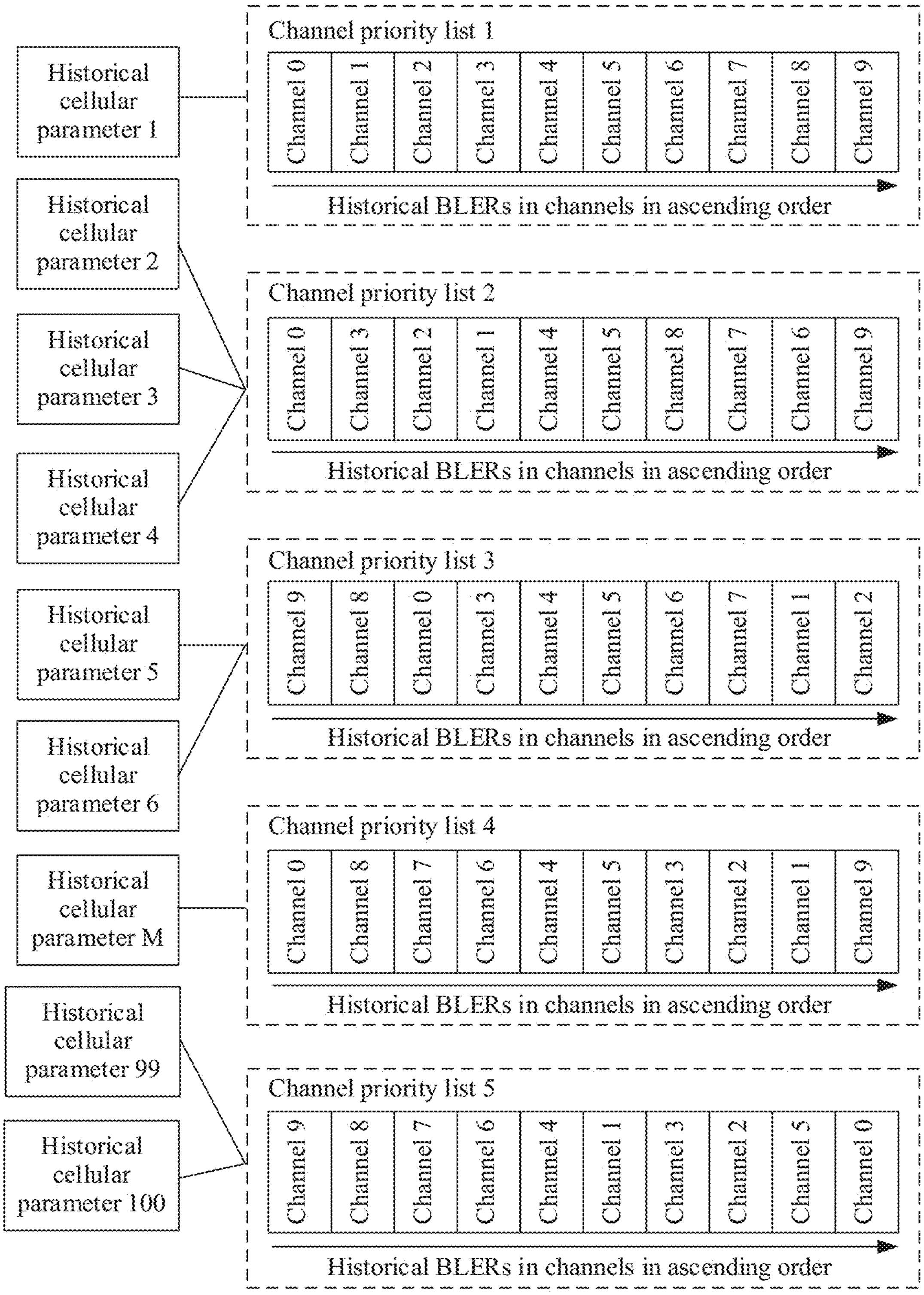
FIG. 7 is a schematic diagram of a correspondence between a historical cellular parameter and a channel priority list according to an embodiment of this application.

The following describes a main process of implementing anti-interference by the main controller module 503 based on the structure shown in FIG. 5 and with reference to FIG. 7. The process includes 601 to 607.

601: The channel learning module 503A obtains the historical cellular parameter in the cellular link and the historical block error rate in each channel on the Wi-Fi link, to obtain the correspondence between the historical cellular parameter and the channel priority list.

The channel learning module 503A obtains the historical cellular parameter in the cellular link from a cellular network modem 106, and obtains the historical block error rate in the Wi-Fi link from the Wi-Fi modem 105.

As described above, the historical block error rate may be calculated according to Formula (18) and related descriptions. Details are not described herein again.

Further, the channel learning module 503A sorts corresponding historical block error rates in each channel on the Wi-Fi link under each historical cellular parameter used by the cellular link, to obtain a corresponding channel priority list, and finally obtains the correspondence between the historical cellular parameter and the channel priority list. When the historical cellular parameters used by the cellular link are the same, the historical block error rates in each channel on the Wi-Fi link may be arranged in ascending order or in descending order. This is not limited herein. For example, as shown in FIG. 7, for a historical cellular parameter 1, when the cellular link sends a cellular signal by using the historical cellular parameter 1, historical block error rates in 10 channels on the Wi-Fi link are different, and may be sorted in the channel priority list.

The historical cellular parameter and the channel priority list may be in a one-to-one relationship. For example, as shown in FIG. 7, when the cellular link uses the historical cellular parameter 1, the historical block error rates in 10 channels on the Wi-Fi link are sorted in ascending order to obtain the channel priority list 1 shown in the figure. The historical cellular parameter and the channel priority list may alternatively be in a many-to-one relationship. For example, as shown in FIG. 7, when the cellular link uses the historical cellular parameter 2, the historical cellular parameter 3, or the historical cellular parameter 4, the historical block error rates in 10 channels on the Wi-Fi link are sorted in ascending order to obtain the channel priority list 2.

The channel learning module 503A sends the finally obtained correspondence between the historical cellular parameter and the channel priority list to the processing module 503C.

It may be understood that, in some other embodiments, a historical bit error rate (BER) of a working channel on the Wi-Fi link may alternatively be obtained by using the channel learning module 503A. The historical BERs in the channels are sorted in a specific sequence to obtain the channel priority list, and to finally obtain a correspondence between the historical cellular parameter and the channel priority list. It may be understood that the correspondence may be the one-to-one or many-to-one correspondence described above. This is not limited herein.

In addition, it may be understood that, the channel learning module 503A obtains the historical cellular parameter in the cellular link and the historical block error rate in each channel on the Wi-Fi link only when a statistical condition is met, to obtain through statistics the historical cellular parameter and the channel priority list more accurately. That the channel learning module 503A obtains the historical cellular parameter in the cellular link and the historical block error rate in each channel on the Wi-Fi link is accumulated by time. For example, interval time of obtaining the historical cellular parameter in the cellular link and the historical block error rate in each channel on the Wi-Fi link may be set to at least seven days or another duration lower limit. This is not limited herein.

602: The channel learning module 503A obtains a cellular parameter (namely, a current cellular parameter) currently used by the cellular link and the block error rate in each channel (including a current working channel and a candidate channel) on the current Wi-Fi link. The channel learning module 503A sends the obtained cellular parameter currently used by the cellular link and the obtained block error rate in each channel on the current Wi-Fi link to the processing module 503C.

It may be understood that both the current working channel and the candidate channel on the Wi-Fi link are in the channel priority list.

It may be understood that, when the current cellular parameter of the cellular link is the same as a historical cellular parameter, the current cellular parameter of the cellular link and the historical cellular parameter correspond to a same channel priority list. Therefore, the current cellular parameter of the cellular link may be used to match a corresponding channel priority list of each channel on the Wi-Fi link.

603: The processing module 503C determines whether the current working channel on the Wi-Fi link meets a working condition. Whether the current working channel on the Wi-Fi link meets the working condition may be determined by determining whether a block error rate in the current working channel on the Wi-Fi link is currently less than a block error rate threshold. If the block error rate in the current working channel is less than the block error rate threshold, it indicates that the current working channel on the Wi-Fi link meets the working condition, and 606 is performed. If the block error rate in the current working channel is greater than or equal to the block error rate threshold, it indicates that the current working channel on the Wi-Fi link does not meet the working condition, and step 604 is performed.

The block error rate threshold in the current working channel on the Wi-Fi link may be set based on a historical block error rate in the channel on the Wi-Fi link under a same historical cellular parameter of the cellular link. For example, a smaller value of historical block error rates in the channel on the Wi-Fi link under the same historical cellular parameter of the cellular link may be set as the block error rate threshold of the channel. Alternatively, an average value of historical block error rates in the channel on the Wi-Fi link under the same historical cellular parameter of the cellular link may be set as the block error rate threshold of the channel. This is not limited herein.

604: The processing module 503C selects a priority channel from candidate channels in the channel priority list corresponding to the current cellular parameter, and determines whether the priority channel is suitable for working. Whether the priority channel meets the working condition may be determined by determining whether a block error rate in the priority channel selected by the processing module 503C in the Wi-Fi link is currently less than the block error rate threshold. If the block error rate in the priority channel is less than the block error rate threshold, it indicates that the priority channel selected by the processing module 503C meets the working condition, and 605 is performed. If the block error rate in the priority channel is greater than or equal to the block error rate threshold, it indicates that the priority channel selected by the processing module 503C does not meet the working condition, and 607 is performed. A step of determining the block error rate threshold is the same as step 603. Details are not described herein again.

It may be understood that the processing module 503C may sequentially select the priority channel from the candidate channels in the channel priority list corresponding to the current cellular parameter, or may randomly select the priority channel from some candidate channels in the channel priority list corresponding to the current cellular parameter. This is not limited herein. For example, the priority channel selected by the processing module 503C may be a candidate channel ranked first in the candidate channels in the channel priority list, or may be any candidate channel in the first six candidate channels.

The channel learning module 503A obtains, through statistics collection, the correspondence between the historical cellular parameter and the channel priority list based on the historical cellular parameter used by the cellular link and the corresponding historical block error rate in each channel on the Wi-Fi link. Generally, when the current cellular parameter is the same as a historical cellular parameter, a candidate channel in a corresponding channel priority list under the historical cellular parameter obtained through statistics is suitable for current work. However, in actual application, some temporary situations may occur. For example, an excessively high quantity of retransmissions or a large quantity of working networks temporarily accessed on the candidate channel causes a large block error rate on the candidate channel, and consequently the candidate channel is not suitable for working. Therefore, it is necessary to determine whether the priority channel selected by the processing module 503C is suitable for working.

605: The processing module 503C sends a frequency hopping indication to the Wi-Fi link by using the frequency hopping indication module 503B. The Wi-Fi link performs frequency hopping to a priority channel that is suitable for working and that is selected by the processing module 503C.

When the priority channel selected by the processing module 503C is suitable for working, the processing module 503C sends a frequency of the priority channel as a frequency hopping indication to the frequency hopping indication module 503B. The frequency hopping indication module 503B then sends the frequency hopping indication to the Wi-Fi receive end 101 of the Wi-Fi link or the Wi-Fi modem 105. After receiving the frequency hopping indication, the Wi-Fi receive end 101 or the Wi-Fi modem 105 sends a frequency hopping signal to indicate the Wi-Fi link to perform frequency hopping to the priority channel.

In some embodiments, the Wi-Fi modem 105 may be used to indicate whether the Wi-Fi link successfully performs frequency hopping to the priority channel. Specifically, after the working channel on the Wi-Fi link performs frequency hopping to the priority channel that is selected by the processing module 503C and is suitable for working, the Wi-Fi modem 105 may collect statistics on a block error rate in a working channel after frequency hopping, and send the block error rate to the processing module 503C. The processing module 503C determines, based on the block error rate that is of the working channel after frequency hopping and collected by the Wi-Fi modem 105, whether frequency hopping succeeds. If frequency hopping fails, the Wi-Fi link still works on the channel before frequency hopping, and the working channel after frequency hopping is not selected within a period of time.

606: The processing module 503C does not send the frequency hopping indication, so that the Wi-Fi link continues to work on the current working channel.

607: The processing module 503C selects another priority channel from the candidate channels in the channel priority list corresponding to the current cellular parameter, and determines whether the priority channel is suitable for working. Whether the another priority channel meets the working condition may be determined by determining whether a block error rate in the priority channel selected by the processing module 503C in the Wi-Fi link is currently less than the block error rate threshold. If the block error rate in the priority channel is less than the block error rate threshold, it indicates that the another priority channel selected by the processing module 503C meets the working condition, and 605 is performed. If the block error rate in the priority channel is greater than or equal to the block error rate threshold, it indicates that the priority channel selected by the processing module 503C does not meet the working condition, and 607 is performed. A step of determining the block error rate threshold is the same as step 603. Details are not described herein again.

It may be understood that, when a memory of the CPE device 200 is limited, the historical cellular parameter used by the cellular link and the corresponding historical block error rate in each channel on the Wi-Fi link may also be updated and iterated in real time, where the historical cellular parameter and the historical block error rate are obtained by the channel learning module 503A. For example, the channel learning module 503A obtains the historical cellular parameter and the historical block error rate of at least one week (7 days). If the channel learning module 503A starts to obtain the historical cellular parameter used by the cellular link and the corresponding historical block error rate in each channel on the Wi-Fi link on Monday, the channel learning module 503A may obtain, in a time sequence from last Sunday to last Monday, the historical cellular parameter used by the cellular link and the corresponding historical block error rate in each channel on the Wi-Fi link, until historical cellular parameter used by the cellular link within 7 days and corresponding historical block error rates in each channel on the Wi-Fi link are accumulatively obtained. When the channel learning module 503A obtains the historical cellular parameter used by the cellular link of the current Monday and the historical block error rate of each channel of the corresponding Wi-Fi link, the channel learning module 503A automatically cancels the historical cellular parameter used by the cellular link and the corresponding historical block error rate in each channel of the Wi-Fi link on last Monday. The channel learning module 503A performs updating and iteration in this way. This can ensure that the historical cellular parameter and the historical block error rate that are obtained by using the channel learning module 503A are closer to the corresponding block error rate in each channel on the Wi-Fi link under the historical cellular parameter used by the current cellular link.

The main controller module 603 may be a CPU, single-chip microcomputer, or DSP chip that has a storage processing function. The main controller module 503 implements functions of the channel learning module 503A, the frequency hopping indication module 503B, and the processing module 503C by running a program.

It should be noted that, m the examples and specification of the present patent, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a" does not, without more constraints, preclude the existence of additional identical elements in the process, method, article, or device that includes the element.

Although this application has been illustrated and described with reference to some example embodiments of this application, a person of ordinary skill in the art should understand that various changes may be made to this application in form and detail without departing from the spirit and scope of this application.

What is claimed is:

1. An electronic device comprising:
- a first transmission circuit comprising:
  - a WI-FI receive end configured to receive a first signal comprising a WI-FI signal and a first cellular signal;
  - a cellular transmit end coupled to the WI-FI receive end and configured to send the first cellular signal to the WI-FI receive end; and
  - a first conversion system coupled to the WI-FI receive end and the cellular transmit end and configured to convert the WI-FI signal into a second cellular signal to be sent by the cellular transmit end; and
- an anti-interference circuit coupled to the first transmission circuit and configured to:
  - perform gain processing on a delayed and phase-inverted cellular signal based on antenna gains of the cellular transmit end and the WI-FI receive end to obtain a delayed, phase-inverted, and gained cellular signal; and
  - cancel the first cellular signal from the first signal using a delayed, phase-inverted, and gained cellular signal.

2. The electronic device of claim 1, wherein the anti-interference circuit is further configured to:
- obtain, at a first moment, the second cellular signal;
- perform delay and phase inversion processing on the second cellular signal to obtain the delayed and phase-inverted cellular signal; and
- further cancel, using the delayed, phase-inverted, and gained cellular signal at a second moment, the first cellular signal,
- wherein a delay duration in which the anti-interference circuit performs the delay and phase inversion processing on the first cellular signal is a time difference between the second moment and the first moment.

3. The electronic device of claim 1, wherein the first cellular signal in the first signal is an interference signal of the WI-FI signal.

4. The electronic device of claim 2, wherein the anti-interference circuit comprises:
- an analog signal obtaining device configured to obtain, at the first moment, an analog cellular signal transmitted between the first conversion system and the cellular transmit end;
- a delayer coupled to the analog signal obtaining device and configured to perform delay processing on the analog cellular signal to obtain a delayed cellular signal;
- a phase inverter coupled to the delayer and configured to perform phase inversion processing on the delayed cellular signal to obtain a delayed and phase-inverted cellular signal;
- an adder coupled to the phase inverter and configured to perform gain processing on the delayed and phase-inverted cellular signal to obtain a delayed, phase-inverted, and gained cellular signal; and
- an analog signal interference canceller configured to:
  - obtain, at the second moment, a second signal transmitted between the WI-FI receive end and the first conversion system; and
  - cancel a cellular signal from the second signal by superposing the delayed, phase-inverted, and gained cellular signal and the second signal.

5. The electronic device of claim 4, further comprising:
- a first frequency mixer;
- a first low-pass filter;
- an analog-to-digital converter, wherein the first frequency mixer, the first low-pass filter, and the analog-to-digital converter are sequentially coupled to the WI-FI receive end and the first conversion system;
- a digital-to-analog converter;
- a second low-pass filter; and
- a second frequency mixer,
- wherein the digital-to-analog converter, the second low-pass filter, and the second frequency mixer are sequentially coupled to the first conversion system and the cellular transmit end.

6. The electronic device of claim 5, wherein the second frequency mixer is configured to output a second analog cellular signal to the cellular transmit end, wherein the analog signal obtaining device is configured to obtain the second analog cellular signal, wherein the analog signal interference canceller is coupled to the WI-FI receive end and the first frequency mixer and configured to superimpose the first signal and the delayed, phase-inverted, and gained cellular signal to cancel the cellular signal from the first signal.

7. The electronic device of claim 5, wherein the first frequency mixer is configured to output a third signal, wherein the second low-pass filter is configured to output a second analog cellular signal to the second frequency mixer, wherein the analog signal obtaining device is configured to obtain the second analog cellular signal, and wherein the analog signal interference canceller is coupled to the first frequency mixer and the first low-pass filter and configured to superimpose the third signal and the delayed, phase-inverted, and gained cellular signal to cancel a cellular signal from the third signal.

8. The electronic device of claim 5, wherein the first low-pass filter is configured to output a third signal, wherein the digital-to-analog converter is configured to output a second analog cellular signal to the second low-pass filter, wherein the analog signal obtaining device is configured to obtain the second analog cellular signal, and wherein the analog signal interference canceller is coupled to the first low-pass filter and the analog-to-digital converter and configured to superimpose the third signal and the delayed, phase-inverted, and gained cellular signal to cancel a cellular signal from the third signal.

9. The electronic device of claim 2, wherein the anti-interference circuit comprises:
- a signal obtaining system configured to obtain, at the first moment, a digital cellular signal transmitted between the first conversion system and the cellular transmit end;

a delay negation system coupled to the signal obtaining system and configured to perform delay and negation processing on the digital cellular signal to obtain a delayed and negated cellular signal;

a gain control system coupled to the delay negation system and configured to perform gain processing on the delayed and negated cellular signal to obtain a delayed, negated, and gained cellular signal; and an interference cancellation system coupled to the gain control system and configured to:

obtain, at the second moment, a second signal transmitted between the WI-FI receive end and the first conversion system; and cancel a cellular signal from the second signal by superposing the delayed, negated, and gained cellular signal and the second signal.

10. The electronic device of claim 9, further comprising:

an analog-to-digital converter coupled to the WI-FI receive end and the first conversion system; and a digital-to-analog converter coupled to the first conversion system and the cellular transmit end.

11. The electronic device of claim 10, wherein the analog-to-digital converter is configured to output a third signal, wherein the digital-to-analog converter is configured to input a second digital cellular signal from the first conversion system, wherein the signal obtaining system is further configured to obtain the second digital cellular signal, and wherein the interference cancellation system is coupled to the first conversion system and the analog-to-digital converter and configured to superimpose the third signal and the delayed, negated, and gained cellular signal.

12. The electronic device of claim 1, further comprising a second transmission circuit, wherein the second transmission circuit comprises:

a cellular receive end configured to receive a cellular signal;

a WI-FI transmit end coupled to the cellular receive end; and a second conversion system coupled to the WI-FI transmit end and configured to convert the cellular signal into a second WI-FI signal to be sent by the WI-FI transmit end, wherein the electronic device is a customer-premises equipment (CPE) device, and wherein the second conversion system comprises a WI-FI modem and a cellular network modem.

13. The electronic device of claim 1, wherein the cellular transmit end comprises a first antenna at a first location, wherein the WI-FI receive end comprises a second antenna at a second location, and wherein the antenna gains of the cellular transmit end and the WI-FI receive end are based on a first ratio of a first power density of the first antenna receiving a test signal with a test power to a second power density of a first ideal radiating element receiving the test signal with the test power and located at the first location and based on a second ratio of a third power density of the second antenna receiving the test signal with the test power to a fourth power density of a second ideal radiating element receiving the test signal with the test power and located at the second location.

14. An anti-interference method implemented by an electronic device, wherein the method comprises:

obtaining, at a first moment, a second-type signal to be sent by a first transmit end of a first transmission circuit of the electronic device;

performing delay and phase inversion processing on the second-type signal to obtain a delayed and phase-inverted second-type signal;

performing, based on antenna gains of the first transmit end and a first receive end of the first transmission circuit, gain processing on the delayed and phase-inverted second-type signal to obtain a delayed, phase-inverted, and gained second-type signal;

receiving a first signal; and cancelling, using the delayed, phase-inverted, and gained second-type signal at a second moment, the second-type signal from the first signal, wherein a delay duration in performing delay and phase inversion processing on the second-type signal is a time difference between the second moment and the first moment.

15. The anti-interference method of claim 14, wherein the second-type signal is an analog signal.

16. The anti-interference method of claim 14, wherein the second-type signal is a digital signal.

17. The anti-interference method of claim 14, wherein the electronic device is a customer-premises equipment (CPE) device.

18. The anti-interference method of claim 14, wherein the first signal comprises a WI-FI signal and a cellular signal, wherein the method further comprises converting the WI-FI signal in the first signal into the cellular signal to be sent by a cellular transmit end, wherein the cellular transmit end is the first transmit end, and wherein the cellular signal is an interference signal of the WI-FI signal.

19. The anti-interference method of claim 14, further comprising converting, by a conversion system of a second transmission circuit of the electronic device, a cellular signal received by a cellular receive end of the second transmission circuit into a WI-FI signal to be sent by a WI-FI transmit end of the second transmission circuit, wherein the electronic device is a customer-premises equipment (CPE) device, and wherein the conversion system comprises a WI-FI modem and a cellular network modem.

20. An electronic device comprising:

a first transmission circuit comprising:

a WI-FI receive end configured to receive a first signal comprising a WI-FI signal and a first cellular signal;

a cellular transmit end coupled to the WI-FI receive end and configured to send the first cellular signal to the WI-FI receive end; and a first conversion system coupled to the WI-FI receive end and the cellular transmit end and configured to convert the WI-FI signal into a second cellular signal to be sent by the cellular transmit end;

an anti-interference circuit coupled to the first transmission circuit and configured to cancel the first cellular signal from the first signal using a delayed, phase-inverted, and gained second-type signal;

an analog-to-digital converter coupled to the WI-FI receive end and the first conversion system; and a digital-to-analog converter coupled to the first conversion system and the cellular transmit end.

* * * * *